United States Patent
Smid et al.

(10) Patent No.: US 12,222,067 B2
(45) Date of Patent: Feb. 11, 2025

(54) LUBRICANT DELIVERY APPARATUS

(71) Applicant: Lubecore International Inc., Campbellville (CA)

(72) Inventors: John Peter Smid, Branchton (CA); Caleb Gordon Smid, Caledonia (CA); Jan Eisses, Campbellville (CA)

(73) Assignee: Lubecore International Inc. (CA)

( * ) Notice: Subject to any disclaimer, the term of this patent is extended or adjusted under 35 U.S.C. 154(b) by 0 days.

(21) Appl. No.: 18/188,907

(22) PCT Filed: Sep. 23, 2021

(86) PCT No.: PCT/CA2021/051324
§ 371 (c)(1),
(2) Date: Mar. 23, 2023

(87) PCT Pub. No.: WO2022/061459
PCT Pub. Date: Mar. 31, 2022

(65) Prior Publication Data
US 2024/0011601 A1    Jan. 11, 2024

Related U.S. Application Data

(60) Provisional application No. 63/082,878, filed on Sep. 24, 2020, provisional application No. 63/139,578, filed on Jan. 20, 2021.

(51) Int. Cl.
*F16N 11/10*     (2006.01)
*F16N 13/16*     (2006.01)
(Continued)

(52) U.S. Cl.
CPC .............. *F16N 11/10* (2013.01); *F16N 13/16* (2013.01); *F16N 23/00* (2013.01); *F16N 29/04* (2013.01);
(Continued)

(58) Field of Classification Search
CPC ...................................................... F16N 11/10
See application file for complete search history.

(56) References Cited

U.S. PATENT DOCUMENTS 5,285,871 A * 2/1994 Sievenpiper ............ F16N 11/10
184/29
6,145,625 A * 11/2000 Prokop ................... F16N 11/10
417/489
(Continued)

FOREIGN PATENT DOCUMENTS

| CA | 2299490 | 8/2001 |
| WO | 2018162418 | 9/2018 |
| WO | 2019221321 | 11/2019 |

OTHER PUBLICATIONS

International Preliminary Report on Patentability issued Mar. 28, 2023 for corresponding PCT Application No. PCT/CA2021/051324 filed Sep. 23, 2021.

(Continued)

*Primary Examiner* — Michael R Mansen
*Assistant Examiner* — Mark K Buse
(74) *Attorney, Agent, or Firm* — Emerson, Thomson & Bennett, LLC; Roger D. Emerson; Peter R. Detorre

(57) ABSTRACT

A lubricant delivery apparatus for installation on a device that includes a moving component that is actuated by an actuating fluid from an actuating fluid source is disclosed. The apparatus includes a lubricant supply reservoir and a pump operably coupled to the reservoir for receiving a pre-determined amount of lubricant from the reservoir and for discharging the pre-determined amount of lubricant from the apparatus. The apparatus has a non-actuated state, wherein the predetermined amount of lubricant is disposed within the pump and an actuated state wherein the predetermined amount of lubricant is discharged from the pump. While the apparatus is installed on the device, the pump is operably coupled to the actuating fluid source such that actuation of the moving component is with effect that the apparatus transitions from the non-actuated state to the actuated state such that the predetermined amount of lubricant is delivered to the moving component.

20 Claims, 18 Drawing Sheets

(51) Int. Cl.
*F16N 23/00* (2006.01)
*F16N 29/04* (2006.01)

(52) U.S. Cl.
CPC ...... *F16N 2250/18* (2013.01); *F16N 2270/30* (2013.01); *F16N 2270/74* (2013.01); *F16N 2280/00* (2013.01)

(56) References Cited

U.S. PATENT DOCUMENTS

| | | | |
|---|---|---|---|
| 2009/0155093 A1* | 6/2009 | Paluncic | F04B 53/18 417/217 |
| 2011/0132687 A1* | 6/2011 | Ifield | F16N 11/10 137/554 |
| 2012/0247876 A1* | 10/2012 | Kreutzkamper | F16N 7/385 184/14 |
| 2013/0240299 A1 | 9/2013 | Jagdale et al. | |
| 2015/0047928 A1* | 2/2015 | Hiner | F15B 20/00 137/488 |
| 2019/0024547 A1* | 1/2019 | Gustafson | F04C 14/00 |
| 2020/0018440 A1* | 1/2020 | Shiratani | E02F 9/0858 |
| 2021/0116068 A1* | 4/2021 | Vermande | F16N 11/10 |

OTHER PUBLICATIONS

Supplementary European Search Report for European App. No. 21 870 639.8 for "Lubricant Delivery Apparatus" published Sep. 23, 2024.

European Search Opinion for European App. No. 21 870 639.8 for "Lubricant Delivery Apparatus" published Sep. 23, 2024.

* cited by examiner

| Element Color Identification | CC's/Stroke |
|---|---|
| Brown | 0.01 |
| Red | 0.02 |
| Black | 0.04 |
| Green | 0.06 |
| Yellow | 0.08 |
| Blue | 0.10 |
| White | 0.12 |

FIG. 13

| Equipment | CC/hour | Equipment | CC/hour |
|---|---|---|---|
| Mini-Excavator | 4 to 6 | Skid Steer | 2 |
| Backhoe Total | 6 to 8 | Refuse Packer | 4 to 8 |
| Backhoe Back End | 4 | Lift Gate | 2 to 3 |
| Backhoe Front End | 4 | Truck Mounted Crane | 4 to 6 |

FIG. 14

LUBRICANT DELIVERY APPARATUS

FIELD

The present disclosure relates to a lubricant delivery apparatus and, more particularly, to a lubrication delivery apparatus that is automated to provide lubrication to moving components of a device upon operation of the moving component associated with the device.

BACKGROUND

Lubricants and/or greases are applied to various different types of devices or equipment that have moving parts. Lubricant and/or grease is applied to the moving parts in order to keep the moving parts separated and moving by reducing friction, surface fatigue, heat generation, operating noise and vibrations. Lubricants and/or greases also serve to carry away contaminants and debris away from the moving components in order to reduce the risk of damage and prevent corrosion due to externally introduced contaminants. Lubricants and/or greases also serve to protect equipment against wear not only by keeping moving components apart, as some lubricants and/or greases contain anti-wear or extreme pressure additives to boost their overall performance against wear and fatigue. Accordingly, lubricants and/or greases are required in proper equipment maintenance to ensure optimal performance of the equipment, extend the overall operating life of the equipment and reduce the need for replacement and or repair.

Lubricants and/or greases are often applied to moving parts using a conventional manual grease gun during regular maintenance intervals of the equipment based on the manufacturer's recommendation. Proper equipment maintenance incorporates OEM recommended lubricant application at regular intervals with the goal of ensuring that the protective lubricant or grease film is preserved between moving surfaces. The required interval for application of lubricant and/or grease is determined by user operating information, equipment type, and environmental conditions (e.g. based on hours of operation or mileage). In most instances these intervals range from a few hours to weekly. In general, the equipment owner/operator is responsible to review the equipment and the lubricant application interval and adjust as needed to refresh the lubricant and prevent premature wear. The manual application of lubricant relies on flush out of old lubricant in one instance during a service interval, while the equipment is idle. The old lubricant is replaced with a fresh application of lubricant with the goal of preventing the failure of the lubricant film to prevent metal-to-metal contact between components. While the manual application of lubricant and/or grease at predetermined maintenance intervals is generally associated with low parts or equipment costs, manual applications are typically associated with high labour costs, can be time consuming, and often require downtime of the device or equipment. Additionally, if the time period between the manual applications of lubricant and/or grease is extended, the device or equipment is prone to damage resulting in higher parts or equipment costs.

While automated lubrication systems that are designed with the intention of providing the proper quantity of lubricant to a moving component are known, conventional automated lubrication systems provide lubrication to moving components based on the use of programmable timers based on the type of platform or vehicle or device on which the automated lubrication system is installed. In such systems, lubricant and/or grease is delivered to a corresponding moving component at regular time intervals regardless of whether the component is actually in use. In some instances, the time-based application of lubricant and/or greases can result in over-greasing of the particular component and unnecessary waste of lubricant.

Accordingly, lubrication systems or devices that offer improved lubrication of moving components and/or that reduce the likelihood of over-greasing and/or unnecessary waste of lubricant are desirable.

SUMMARY

According to a first aspect of the disclosure there is provided a lubricant delivery apparatus configured for installation within a device that includes a moving component that is actuated by an actuating fluid from an actuating fluid source of the device, comprising a lubricant supply reservoir configured for storing a supply of lubricant; a pump operably coupled to the lubricant supply reservoir for receiving a pre-determined amount of lubricant from the lubricant supply reservoir and discharging the pre-determined amount of lubricant from the lubricant delivery apparatus via a lubricant discharge port; and an actuating fluid communication port configured for receiving a supply of actuating fluid from the actuating fluid source. The lubricant delivery apparatus has a non-actuated state, wherein the predetermined amount of lubricant is disposed within the pump and the pump is disposed for receiving actuating fluid from the actuating fluid source of the device via the actuating fluid communication port; and an actuated state wherein the predetermined amount of lubricant is discharged from the pump via a lubricant discharge port. The lubricant delivery apparatus is configured for operable coupling to the actuating fluid source of the device such that while the lubricant delivery apparatus is installed on the device in fluid communication with the actuating fluid source, actuation of the moving component is with effect that actuating fluid is supplied to the lubricant delivery apparatus via the actuating fluid communication port; and the lubricant delivery apparatus transitions from the non-actuated state to the actuated state.

According to another aspect of the present disclosure there is provided An apparatus including a moving component that is actuated by an actuating system that operates via an actuating fluid that is supplied to the actuating system from an actuating fluid source, comprising a lubricant delivery apparatus for delivering a predetermined amount of lubricant to the moving component upon actuation of the moving component, wherein the lubricant delivery apparatus includes a lubricant supply reservoir configured for storing a supply of lubricant; a pump operably coupled to the lubricant supply reservoir for receiving a pre-determined amount of lubricant from the lubricant supply reservoir and discharging the pre-determined amount of lubricant from the lubricant delivery apparatus via a lubricant discharge port that is operably coupled to the moving component; and an actuating fluid communication port configured for operable coupling to the actuating system for receiving a supply of actuating fluid from the actuating fluid source. The lubricant delivery apparatus has a non-actuated state, wherein the predetermined amount of lubricant is disposed within the pump and the pump is disposed for receiving actuating fluid from the actuating fluid source via the actuating fluid communication port; and an actuated state wherein the predetermined amount of lubricant is discharged from the pump via a lubricant discharge port; and actuation of the moving component is with effect that actuating fluid is supplied to the lubricant delivery apparatus via the actuating fluid communication port with effect that the lubricant delivery apparatus transitions from the non-actuated state to the actuated state.

BRIEF DESCRIPTION OF THE DRAWINGS

Reference will now be made, by way of example, to the accompanying drawings which show example embodiments of the present application, and in which:

FIG. 13 is a table that illustrates various example embodiments of lubricant metering element sizes that can be incorporated into the lubricant delivery apparatus of the present disclosure;

FIG. 14 is a table that illustrates the suggested cc/hour used by various pieces of equipment into which the lubricant delivery apparatus of the present disclosure may be incorporated;

Similar reference numerals may have been used in different figures to denote similar components.

DESCRIPTION OF EXAMPLE EMBODIMENTS

Figure 1:
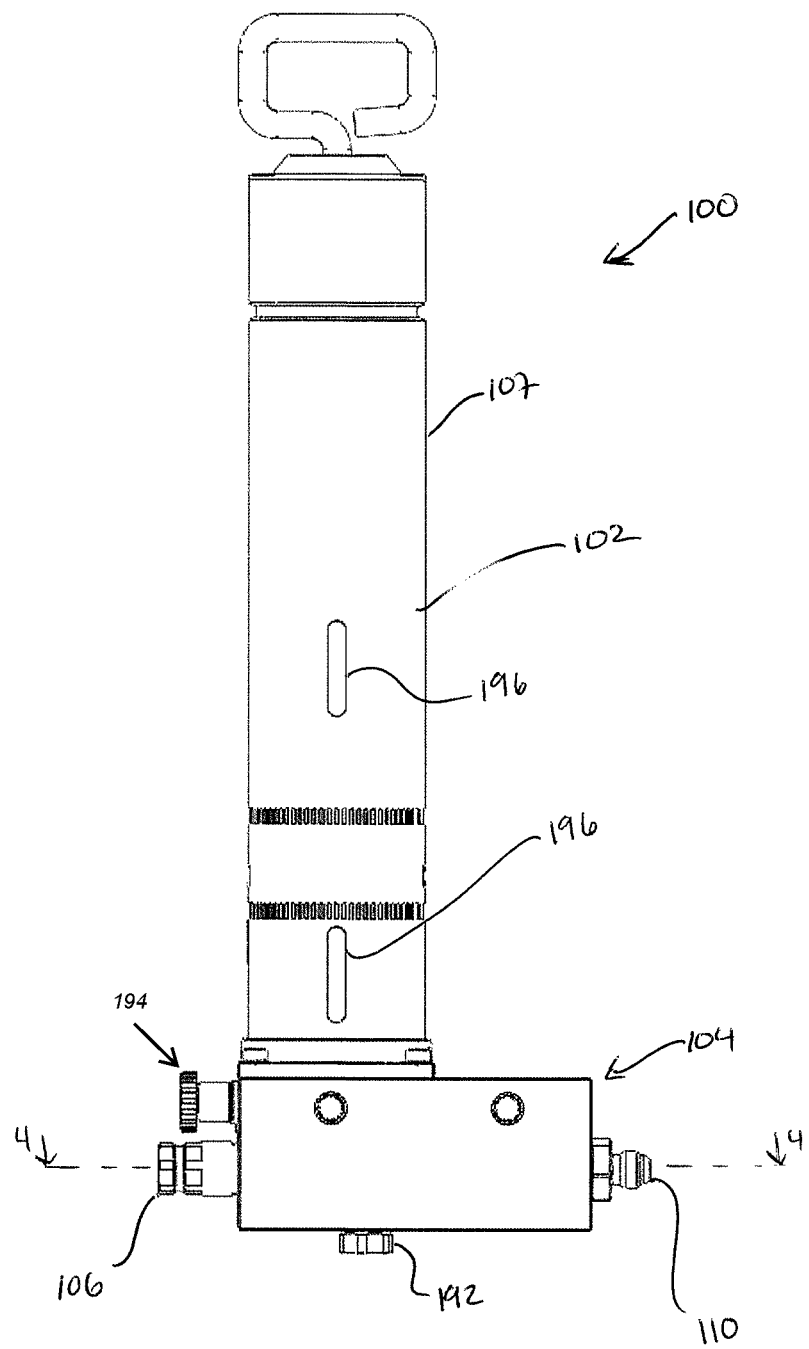
FIG. 1 is a front view of a lubricant delivery apparatus according to an example embodiment of the present disclosure.
Figure 2:
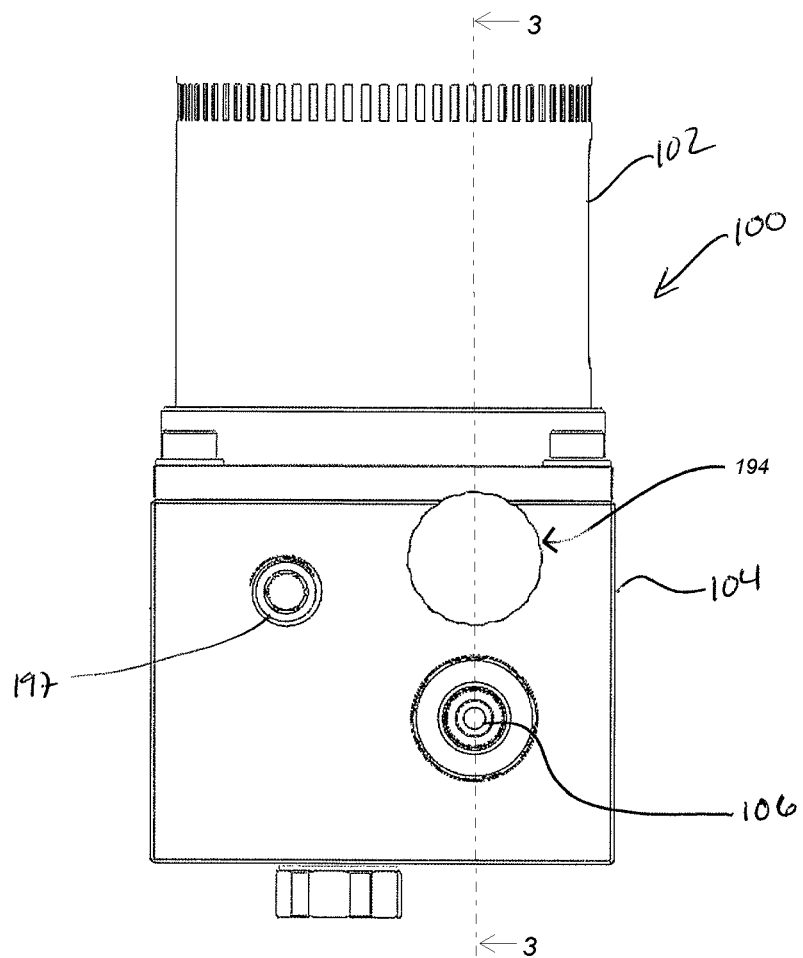
FIG. 2 is a left side view of a base portion of the lubricant delivery apparatus of FIG. 1.

Referring now to FIGS. 1-20, there are shown example embodiments of a lubricant delivery apparatus 100 according to the present disclosure. The lubricant delivery apparatus 100 is configured for delivering a predetermined amount of lubricant to a component that requires lubrication. More specifically, in use, the lubricant delivery apparatus 100 is configured for installation within a device 1000 that includes one or more moving components 1002 that each require lubrication while the corresponding moving component 1002 is in use. In this respect, the lubricant delivery apparatus 100 is configured for installation within the device 1000 such that the lubricant delivery apparatus 100 is operably coupled to the operating system that serves to operate or actuate the moving component 1002 of the device 1000, as will be described in further detail below.

In some embodiments, for example, the device 1000 is a backhoe with corresponding moving components 1002 including the front-end bucket and the hoe, only one of which may be in use or operation at one time. In some embodiments, for example, the device 1000 is a delivery truck with the corresponding moving component 1002 including the lift gate. In some embodiments, for example, the component 1000 includes a mobile crane or crane truck with the moving component 1002 including the crane arm. In some embodiments, for example, the device 1000 is a farm tractor and the corresponding moving component 1002 includes a front-end loader. In some embodiments, for example, the device 1000 includes a garbage truck and the moving component 1002 includes the refuse packer which is only used periodically. In some embodiments, for example, the device 1000 includes mini-excavators, skid steers or other similar equipment that includes intermittently or periodically used moving components 1002. Therefore, it will be understood that the lubrication delivery apparatus 100 of the present disclosure may be incorporated into any suitable device 1000 with moving components 1002 that require lubrication to ensure proper operation of the moving component 1002. Example embodiments of suitable devices 1000 or equipment components into which the lubricant delivery apparatus 100 may be incorporated are illustrated, for example, in FIGS. 11A-11C.

As set out above, the lubricant delivery apparatus 100 is configured for installation within the device 1000 such that the lubricant delivery apparatus 100 is actuated by the same actuating fluid that is used within the operating system that operates the moving component 1002 associated with the device 1000. In some embodiments, for example, the device 1000 into which the lubrication delivery apparatus 100 is installed includes hydraulically activated moving components 1002. In such example embodiments, the lubricant delivery apparatus 100 is installed within the device 1000 and is operably coupled to the hydraulic system that includes an actuating fluid source 1004 for operating that operates the one or more moving components 1002 associated with the device 1000. In some embodiments, for example, the device 1000 into which the lubrication delivery apparatus 100 is installed includes pneumatically activated moving components 1002. In such example embodiments, the lubricant delivery apparatus 100 is installed within the device 1000 and is operably coupled to the pneumatic system that operates the one or more moving components 1002 of the device 1000. Therefore, while example embodiments of the lubricant delivery apparatus 100 are described below in connection with moving components having hydraulically activated systems, it will be understood that the lubricant delivery apparatus can also be pneumatically activated where the driving fluid or actuating fluid is air, rather than oil or any other suitable hydraulic fluid. Accordingly, it will be understood that present disclosure is not intended to be limited solely to a hydraulically activated lubricant delivery apparatus 100, as the principle of operation of the lubricant delivery apparatus 100 is applicable to pneumatically operated moving components as well as hydraulically operated moving components.

Referring now to the example embodiment illustrated in FIGS. 1-6, the lubricant delivery apparatus 100 includes a lubricant supply reservoir 102 that is configured for storing a supply of lubricant. A pump 104 is operably coupled to the lubricant supply reservoir 102 and is configured for receiving a predetermined amount of lubricant 105 from the lubricant supply reservoir 102 and for discharging the pre-determined amount of lubricant, via a lubricant discharge port 106, for delivery to a moving component 1002 that requires lubrication. In some embodiments, the lubricant supply reservoir 102 is disposed within a housing 107, wherein the housing 107, together with the lubricant supply reservoir 102, is disposed on the pump 104 such that the lubricant supply reservoir 102 is operably coupled to the pump 104. In some embodiments, for example, the lubricant supply reservoir 102 is a conventional grease tube canister as often used in manual grease gun devices wherein the grease tube canister includes a plunger (not shown) pushed by a spring (not shown) to pressurize the grease or lubricant contained within the canister such that it flows into the corresponding grease element port. Lubricant or grease is disposed within the grease tube canister or lubricant supply reservoir 102 by installing a tube of grease or lubricant into the canister or lubricant supply reservoir 102.

Figure 3:
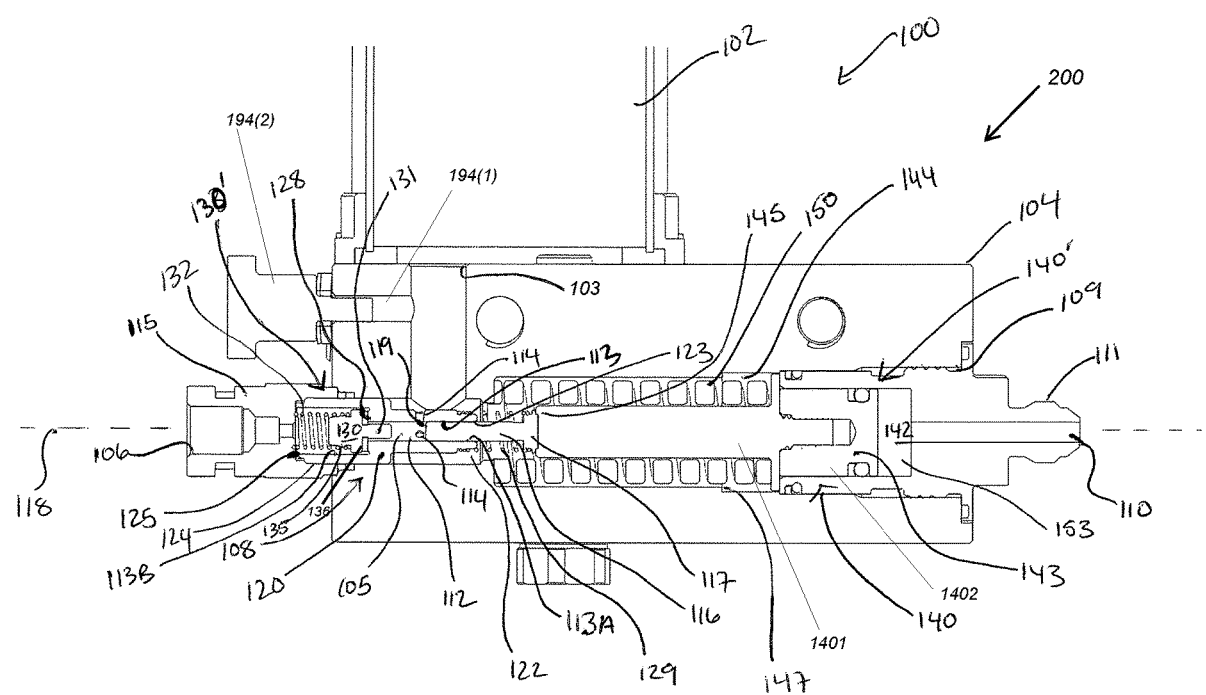
FIG. 3 is a cross-sectional, detail view of the base of the lubricant delivery apparatus of FIG. 1 taken along section line 3-3 shown in FIG. 2.

With reference now to FIG. 3, the pump 104 includes a lubricant inlet passage 103 for delivering a supply of lubricant from the lubricant supply reservoir 102 to a lubricant-receiving space 112 defined within the pump 104. The lubricant supply reservoir 102 is operably coupled to the pump 104 such that fluid communication is established between the lubricant supply reservoir 102 and the lubricant receiving space 112, via the lubricant inlet passage 103, with effect that the pre-determined or pre-set amount of lubricant 105 from the lubricant supply reservoir 102 is communicated or delivered to the lubricant-receiving space 112 defined within the pump 104. See for instance the flow directional arrows shown in FIG. 15 wherein the pre-determined or pre-set amount of lubricant 105 that is communicated to the pump 104, via the lubricant inlet passage 103, is received within and stored within the lubricant-receiving space 112.

The pump 104 is configured for receiving pressurized fluid from an actuating fluid source 1004 via an actuating fluid communication port 110, wherein the pressurized fluid serves as the actuating fluid or driving fluid that operates the pump 104. In some embodiments, for example, the actuating fluid communication port 110 is defined by an actuating fluid inlet adapter or coupler 111 that is disposed within a corresponding opening 109 defined within the pump 104. In some embodiments, for example, the pressurized actuating fluid is directed to the pump 104 from the source and is also returned to the source via the same actuating fluid communication port 110. In other embodiments, for example, the pump 104 includes an actuating fluid inlet port 110A and an actuating fluid return port 110B, wherein the actuating fluid is delivered to the pump 104 via the actuating fluid inlet port 110A and is returned to the source, from the pump 104, via the actuating fluid return port 110B, as will be described below in reference to the example embodiment illustrated in FIGS. 7-10.

Referring again to FIG. 3, in some embodiments, for example, the pump 104 includes a lubricant metering element 108 that is configured for receiving the pre-determined or pre-set amount of lubricant 105 from the lubricant supply reservoir 102, and for discharging the pre-determined or pre-set amount of lubricant 105 from the lubricant delivery apparatus 100. In some embodiments, for example, the lubricant metering element 108 defines the lubricant-receiving space 112. Accordingly, the lubricant metering element 108 is disposed within the pump 104 such that the lubricant-receiving space 112 is disposed in fluid communication with the lubricant inlet passage 103 via one or more lubricant communicators or ports 114 disposed within the lubricant metering element 108. In some embodiments, for example, the lubricant-receiving space 112 is a portion of a longitudinally extending passage 113 that extends through the lubricant metering element 108, wherein the lubricant communicators 114 extend through the body 120 that defines the lubricant metering element 108 and are in communication with the longitudinally extending passage 113.

In some embodiments, for example, the lubricant metering element 108 includes a delivery piston 116 that is disposed within the body 120 that defines the lubricant metering element 108 and is configured for slidable movement relative to the body 120 along the longitudinally extending passage 113. Accordingly, the lubricant metering element body 120 has a first end 122 that defines a first, delivery piston-receiving opening 123 that is configured for receiving the delivery piston 116. A second, opposite end 124 of the lubricant metering device 108 defines a second opening 125 that is configured for discharging lubricant from the lubricant receiving space 112 defined by the lubricant metering element 108. The axially extending passage 113 extends between and interconnects the first, delivery piston-receiving opening 123 and the second opening 125. In some embodiments, for example, the second opening 125 defined by the lubricant metering element 108 serves as the lubricant discharge port 106. In some embodiments, for example, the second opening 125 defined by the lubricant metering element 108 feeds the lubrication discharge port 106 which is defined within a lubricant discharge port adapter or coupler 115 that is coupled to the pump 104 via coupling with the lubricant metering element 108.

In some embodiments, for example, the longitudinally extending passage 113 includes a first portion 113A and a second portion 113B. The first portion 113A extends from the first opening 123 at the first end 124 of the lubricant metering element 108 to a shoulder surface 128 that extends outwardly relative to the first portion 113A of the passage 113, relative to the central longitudinal axis 118 of the passage 113. The second portion 113B of the passage 113 extends from the shoulder surface 128 to the second opening 125 of the lubricant metering element 108. Accordingly, the first portion 113A and the second portion 113B of the passage 113 are configured such that, the second portion 113B of the passage 113 defines a larger cross-sectional area, as taken along an axis that extends perpendicular to the central longitudinal axis 118 of the passage, than the cross-sectional area defined by the first portion 113A of the passage 113. In some embodiments, for example, the first portion 113A and the second portion 113B of the passage 113 are cooperatively configured such that the diameter of the first portion 113A of the passage 113 is less than the overall diameter of the second portion 113B of the longitudinally extending passage 113.

In some embodiments, for example, the delivery piston 116 extends between a first end 117 and a second end 119 that is disposed opposite to the first end 117. The delivery piston 116 is disposed within the lubricant metering element 108 such that the second end 119 of the delivery piston 116 extends through the first opening 123 and is disposed within the first portion 113A of the passage 113B while the first end 117 of the delivery piston 116 remains external to the first end 124 of the lubricant metering element 108. A delivery piston-biasing member 129 is disposed intermediate the first end 124 of the lubricant metering element 108 and the first end 117 of the delivery piston 116 for biasing the delivery piston 116 in a first, non-actuated position, relative the lubricant metering element 108. While disposed in the first, non-actuated position, the first end 117 of the delivery piston 116 is spaced apart from the first end 124 of the lubricant metering element 108 while the second end 119 of the delivery piston 116 is disposed within the first portion 113A of the passage 113 and is disposed up-hole from the shoulder surface 128 that defines the transition between the first portion 113A of the longitudinally extending passage 113 and the second portion 113B of the passage 113.

In some embodiments, for example, the lubricant metering element 108 includes a valve body 130 that is disposed within the second portion 113B of the passage 113 defined within the body 120 of the lubricant metering element 108 and disposed for displacement relative to the body 120 along the second portion 113B of the passage 113. A valve body-biasing member 132 is disposed within the second portion 113B of the passage 113 and serves to bias the valve body 130 in a non-actuated or first position 130' wherein the valve body 130 is disposed against the shoulder surface 128 thereby fluidly isolating the first portion 113A of the axially extending passage 113 from the second portion 113B of the axially extending passage 113. Accordingly, while the valve body 130 is disposed in the non-actuated or first position 130', the lubricant-receiving space 112 is fluidly isolated from the lubricant discharge port 106.

In some embodiments, for example, the valve body 130 has a first valve body portion that 131 that extends into the first portion 113A of the axially extending passage and a second valve body portion 135, the first valve body portion 131 extending from the second valve body portion 135. The second valve body portion 135 defines a sealing surface 136 that is configured for abutting against the shoulder surface 128 while the valve body 130 is disposed in the non-actuated position 130'. In some embodiments, the first valve body portion 131 is configured for guiding displacement of the valve body 130 relative to the axially extending passage 113 of the lubricant metering element 108 as the valve body 130 slides relative to the axially extending passage 113. More specifically, the first valve body portion 131 is sized such that, as the valve body 130 is displaced from the non-actuated position 130' (as shown in FIG. 3) to the actuated position 130'' (as shown for instance in FIG. 5), axial alignment of the valve body 130 with the central longitudinal axis 118 of the longitudinally extending passage 113 is maintained as the valve body 130 is displaced along the longitudinally extending passage 113.

Referring again to FIG. 3, the pump 104 includes an actuator 140 that is configured for slidable movement within a longitudinally extending actuating passage 144 disposed within the pump 104. The longitudinally extending actuating passage 144 is configured such that a first end of the longitudinally extending actuating passage 144 is in communication with the actuating fluid communication port 110 via an actuating fluid-receiving space 142, and a second end of the longitudinally extending actuating passage 144 is in communication with first end 122 of the lubricant metering element 108.

The actuator 140 is configured for slidable movement within the longitudinally extending actuating passage 144 for effecting discharge of the pre-determined amount of lubricant 105 that is stored within the lubricant-receiving space 112 defined by the lubricant metering element 108. In use, while the lubricant delivery apparatus 100 is installed within a device 1000 including a moving component 1002, operation of the moving component 1002 is with effect that the actuating fluid, that serves to operate the moving component 1002, is shared with the lubricant delivery apparatus 100. Accordingly, operation of the moving component 1002 is with effect that actuating fluid is delivered to the actuating fluid-receiving space 142 via the actuating fluid communication port 110 for effecting displacement of the actuator 140. As actuating fluid is received within actuating fluid-receiving space 142, the volume of the actuating fluid-receiving space 142 increases which effects displacement of the actuator 140 along the longitudinally extending actuating passage 144. Displacement of the actuator 140 along the longitudinally extending actuating passage 144 is with effect that the pre-determined amount of lubricant 105 is discharged from the pump 104 via the lubricant discharge port 106. In some embodiments, for example, the actuating passage 144 includes an actuator displacement-limiter 147 which defines the maximum displacement of the actuator 140 along the actuating passage 144. Accordingly, in some embodiments, while the actuator 140 is disposed in the actuated state 140'', the actuator 140 is disposed in abutting contact with the actuator displacement-limiter 147.

Referring again to FIG. 3, the actuator 140 is disposed within the actuating passage 144 such that a first end 143 of the actuator 140 is disposed in communication with the actuating fluid-receiving space 142, the actuating fluid, therefore, acting against the first end 143 of the actuator 140 for effecting displacement of the actuator 140 along the actuating passage 144. As actuating fluid is received within the actuating fluid-receiving space 142, the volume of the actuating fluid-receiving space 142 increases which effects displacement of the actuator 140 along the axially extending actuating passage 144 defined within the pump 104. A second, distal end 145 of the actuator 140 is operably coupled to the first end 117 of the delivery piston 116 such that displacement of the actuator 140 along the actuating passage 144 effects displacement of the delivery piston 116 relative to the longitudinally extending passage 113 of the lubricant metering element 108.

In some embodiments, for example, an actuator biasing element 150 is disposed within the actuating passage 144 and serves to bias the actuator 140 into a non-actuated position 140' (illustrated in FIG. 3) wherein the actuating fluid-receiving space 142 defines a first non-actuated volume 153. In use, once the volume of actuating fluid received within the actuating fluid-receiving space 142 exceeds the first non-actuated volume 153 and the actuating force applied to the actuator 140, by the actuating fluid, overcomes the force applied to the actuator 140 by the actuator-biasing element 150, the actuator 140 begins to displace along the actuating passage 144. Once the force applied to the actuator 140 by the pressurized actuating fluid within the actuating fluid-receiving space 142 is removed, the actuator-biasing element 150 serves to ensure that the actuator 140 returns to the non-actuated position 140'.

While the lubricant delivery apparatus 100 is disposed in a non-actuated state 200, as illustrated in FIG. 3, the lubricant-receiving space 112 is defined within the longitudinally extending passage 113 between the second end 119 of the delivery piston 116 and the valve body 130. In some embodiments, for example, as illustrated for example in FIGS. 3 and 4, the lubricant-receiving space 112 is defined within the first portion 113A of the longitudinally extending passage 113 between the second end 119 of the delivery piston 116 and the first valve body portion 131 of valve body 130.

Actuation of the delivery piston 116 from a first, non-actuated position, is with effect that the delivery piston 116 is displaced relative to the lubricant metering element body 120 that defines the lubricant metering element 108. Accordingly, the actuation force that is applied to the actuator 140 by the pressurized fluid within the actuating fluid receiving space 142 which is transmitted to the delivery piston 116, via the second end 145 of the actuator 140, to effect displacement of the delivery piston 116 relative to the lubricant metering element body 120, is transmitted through the predetermined amount of lubricant 105 contained within the lubricant-receiving space 112. Displacement of the delivery piston 116 relative to the lubricant metering element body 120 effects displacement of the valve body 130 away from the shoulder surface 128 defined at the transition between the first portion 113A of the longitudinally extending passage 113 and the second portion 113B of the longitudinally extending passage 113. Displacement of the valve body 130 away from the shoulder surface 128 establishes fluid communication between the first portion 113A and the second portion 113B of the longitudinally extending passage 113.

Once fluid communication between the first portion 113A and the second portion 113B of the axially extending passage 113 is established, the predetermined amount of lubricant 105 begins to discharge from the lubricant-receiving space 112 into the second portion 113B of the axially extending passage 113. Accordingly, the pre-determined amount of lubricant 105 is discharged from the lubricant-receiving space 112 into the second portion 113B of the longitudinally extending passage 113, around the valve body 130, and out through the lubricant discharge port 106. In example embodiments wherein the lubricant discharge port 106 is defined within a lubricant discharge port adapter or coupler 115 (as shown for instance in FIG. 3) the second opening 135 of the lubricant metering element 108 is in communication with the lubricant discharge port adapter 115. Therefore, the predetermined amount of lubricant 105 is discharged from the lubricant delivery apparatus 100 via the lubricant discharge opening 106 defined by the lubricant discharge port adapter 115 which is fed by the second opening 125 of the lubricant metering element 108.

Operation of the lubricant delivery apparatus 100 will now be described in further detail with reference to FIGS. 4-6 and FIGS. 15-18. As set out above, the lubricant delivery apparatus 100 is installed within a device 1000 that includes one or more moving components 1002 that are each, independently, operated by a driving fluid or actuating fluid. The lubricant delivery apparatus 100 is installed within the device 1000 such that the lubricant delivery apparatus 100 is in communication with the operating system (or hydraulic system with actuating fluid source 1004) that operates the one or more moving components 1002. Accordingly, the lubricant delivery apparatus 100 is installed within the device 1000 such that the same driving fluid, or actuating fluid, that actuates the moving component 1002, operates the lubricant delivery apparatus 100. In example embodiments, wherein the moving component 1002 is actuated via a hydraulic cylinder, the lubricant delivery apparatus 100 is installed within the device 1000 such that the actuating fluid communication port 110 is in fluid communication with the lift side or driving side of a corresponding hydraulic cylinder. Therefore, upon actuation of the moving component, hydraulic fluid (or any suitable actuating fluid) is supplied to the hydraulic cylinder (or actuator) associated with the moving component 1002, for operating the moving component 1002. At the same time, hydraulic fluid (or any suitable actuating fluid) is also supplied to the lubricant delivery apparatus 100 via the actuating fluid communication port 100 to operate the lubricant delivery apparatus 100. Accordingly, the lubricant delivery apparatus 100 operates only when the moving component 1002 is in use thereby only supplying lubricant to the moving component 1002 when the moving component 1002 is being operated. By providing lubricant to the moving component 1002 only while the moving component 1002 is in use, the potential for over-greasing of the moving component 1002 is diminished.

Figures 4, 5:
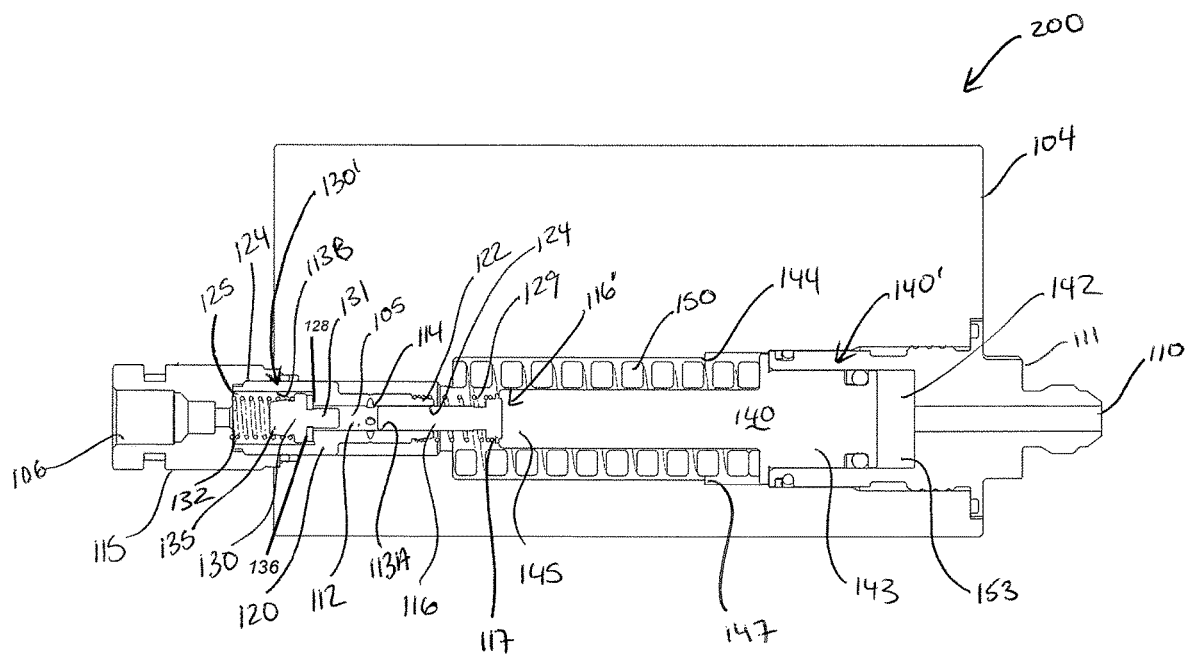
FIG. 4 is a cross-sectional, detail view of the base of the lubricant delivery apparatus of FIG. 1 taken along section line 4-4 shown in FIG. 1, illustrating a first, operational state or rest state of the apparatus.
FIG. 5 is a cross-sectional, detail view of the base of the lubricant delivery apparatus as shown in FIG. 4, illustrating a second, operational state or actuated state of the apparatus.
Figure 6:
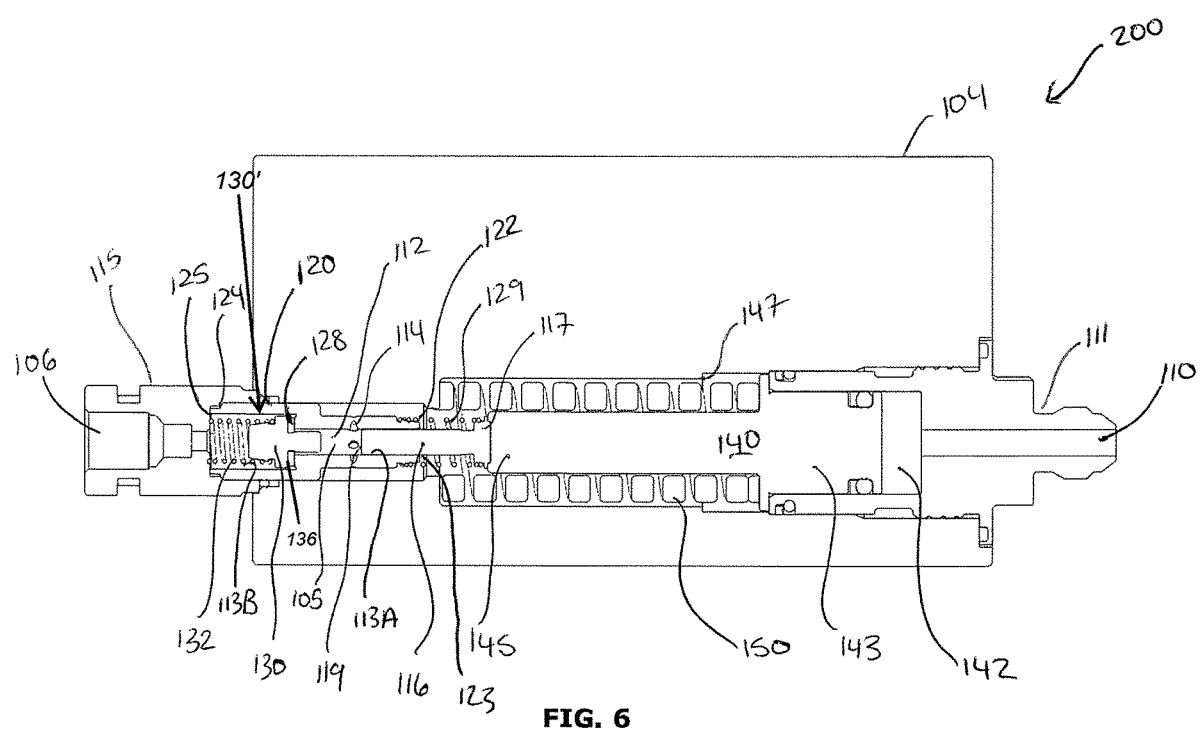
FIG. 6 is a cross-sectional, detail view of the base of the lubricant delivery apparatus as shown in FIG. 4, illustrating the return of the lubricant delivery apparatus 100 to the first, operational state or rest state of the apparatus.
Figure 7:
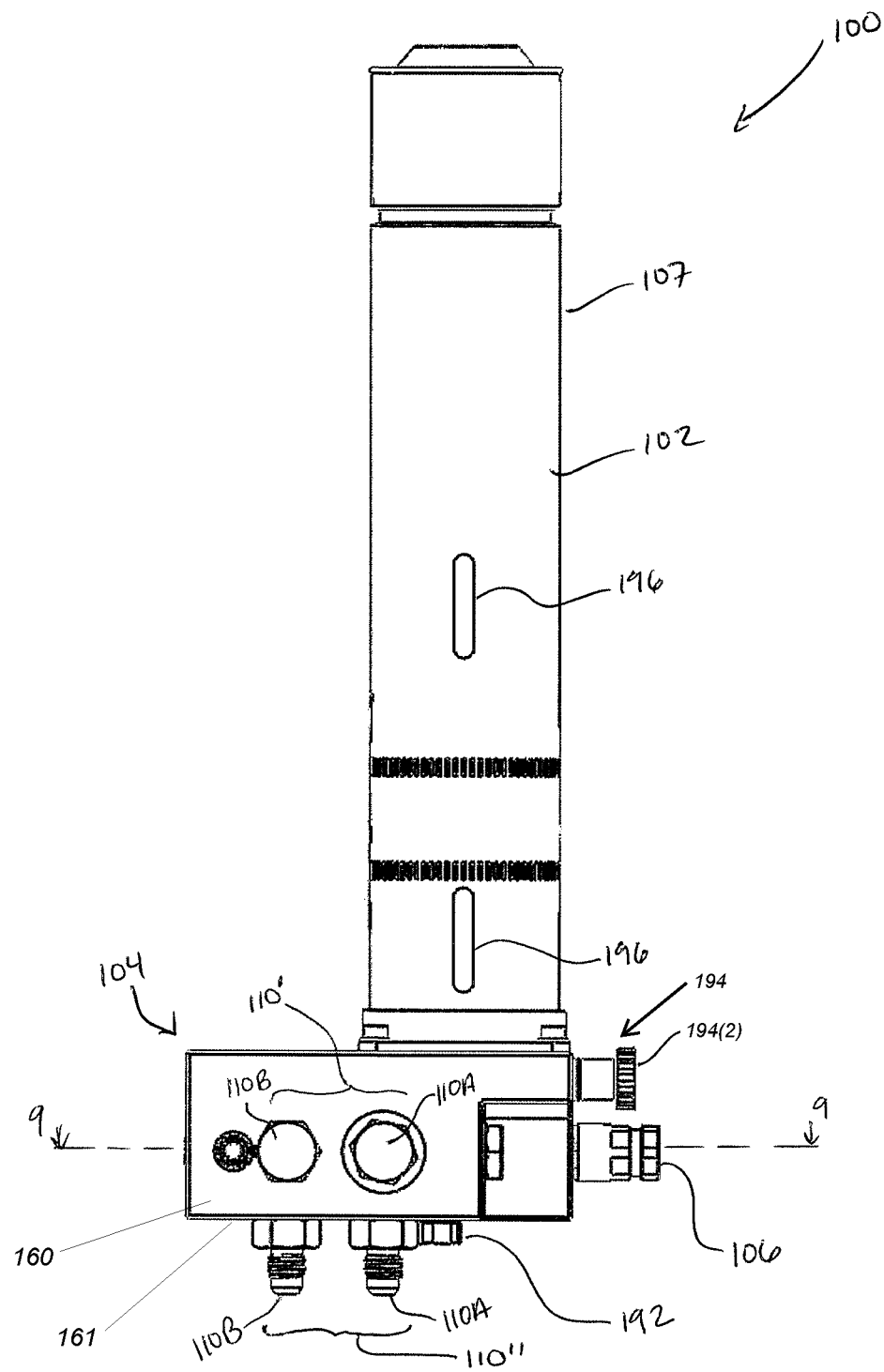
FIG. 7 is a front view of a lubricant delivery apparatus according to another example embodiment of the present disclosure.
Figure 8A:
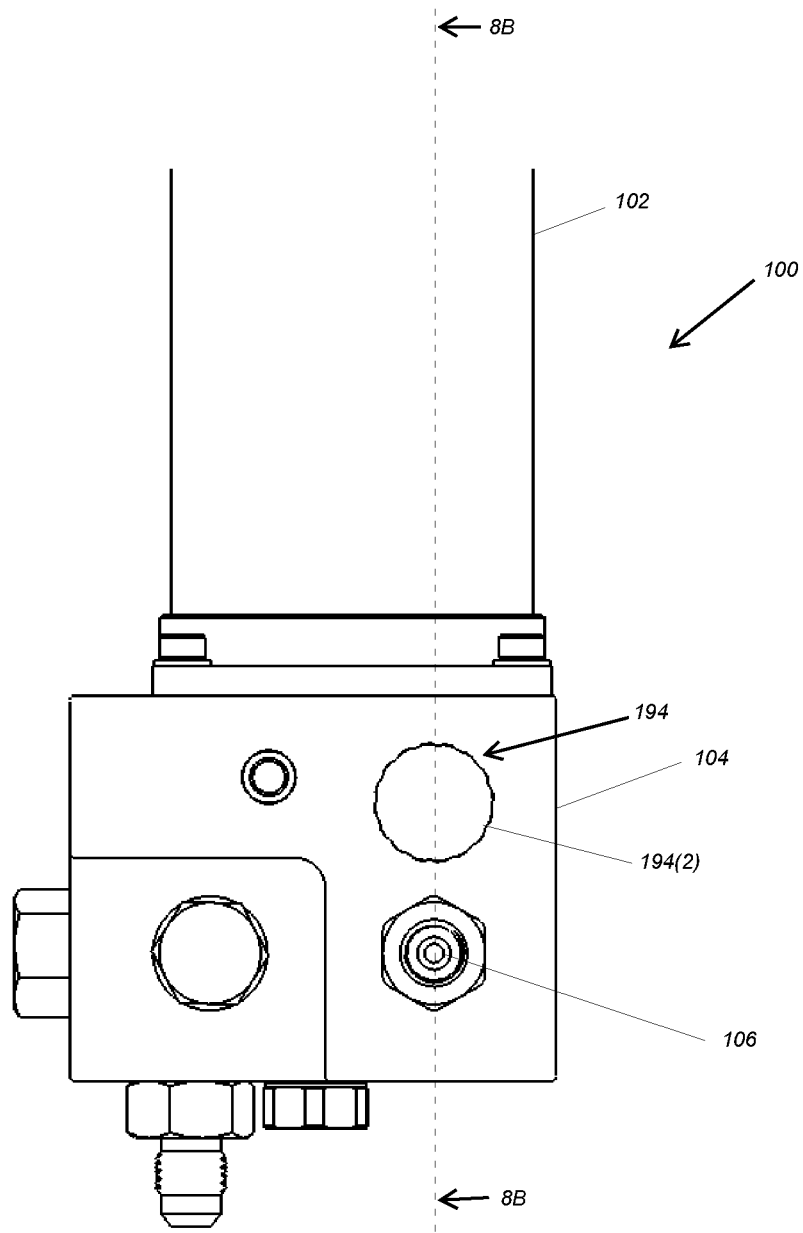
FIG. 8A is a left side view of a base portion of the lubricant delivery apparatus of FIG. 7 taken along section line 8B-8B shown in FIG. 7.
Figure 8B:
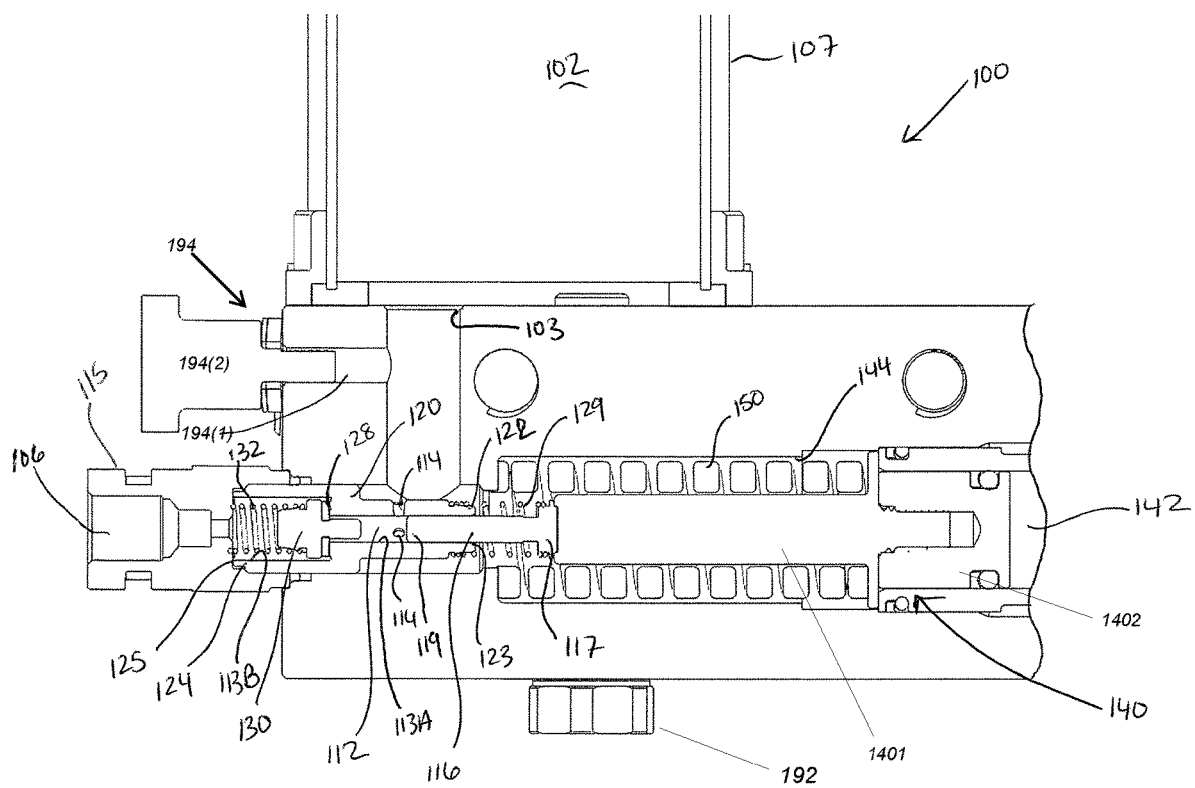
FIG. 8B is a cross-sectional, detail view of the base of the lubricant delivery apparatus of FIG. 7 similar to the cross-sectional view shown in FIG. 3.
Figure 9:
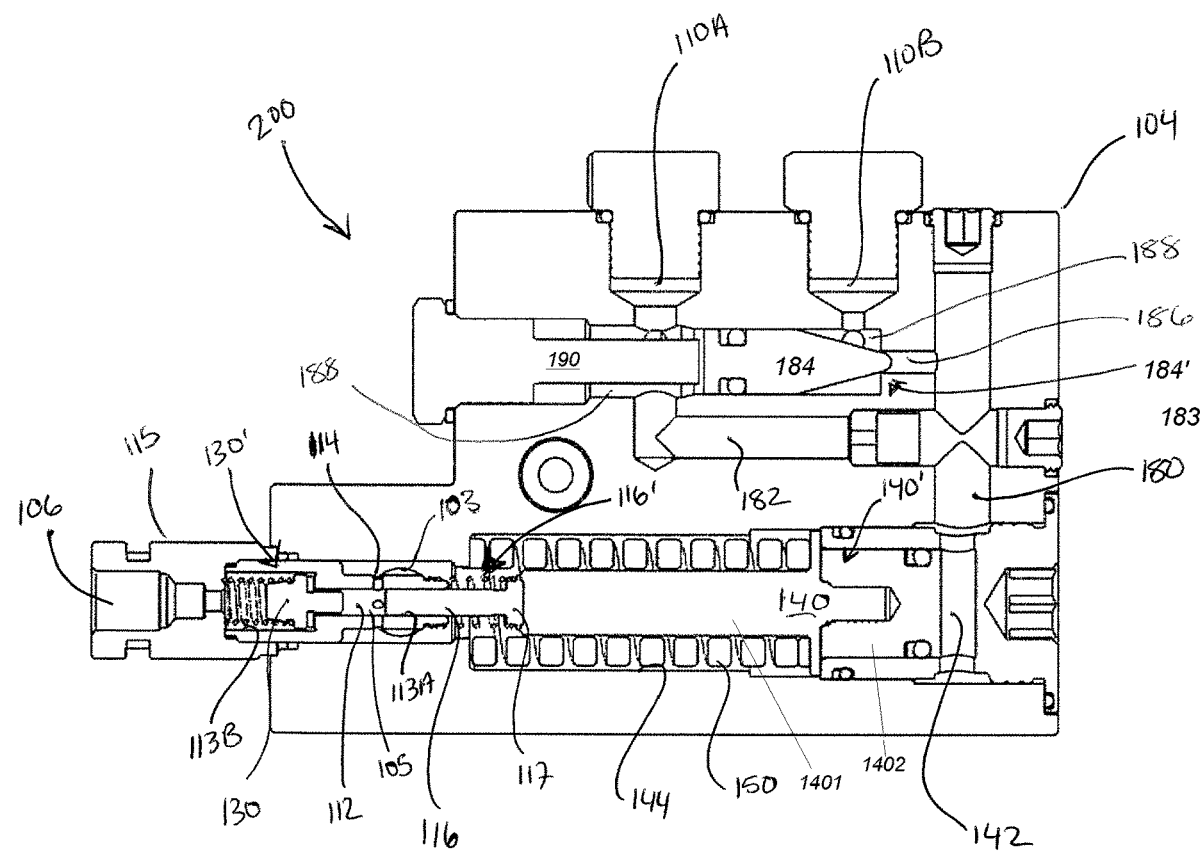
FIG. 9 is a cross-sectional, detail view of the base of the lubricant delivery apparatus of FIG. 7 taken along section line 9-9 shown in FIG. 7 in a first, operational state or rest state of the apparatus.
Figure 10:
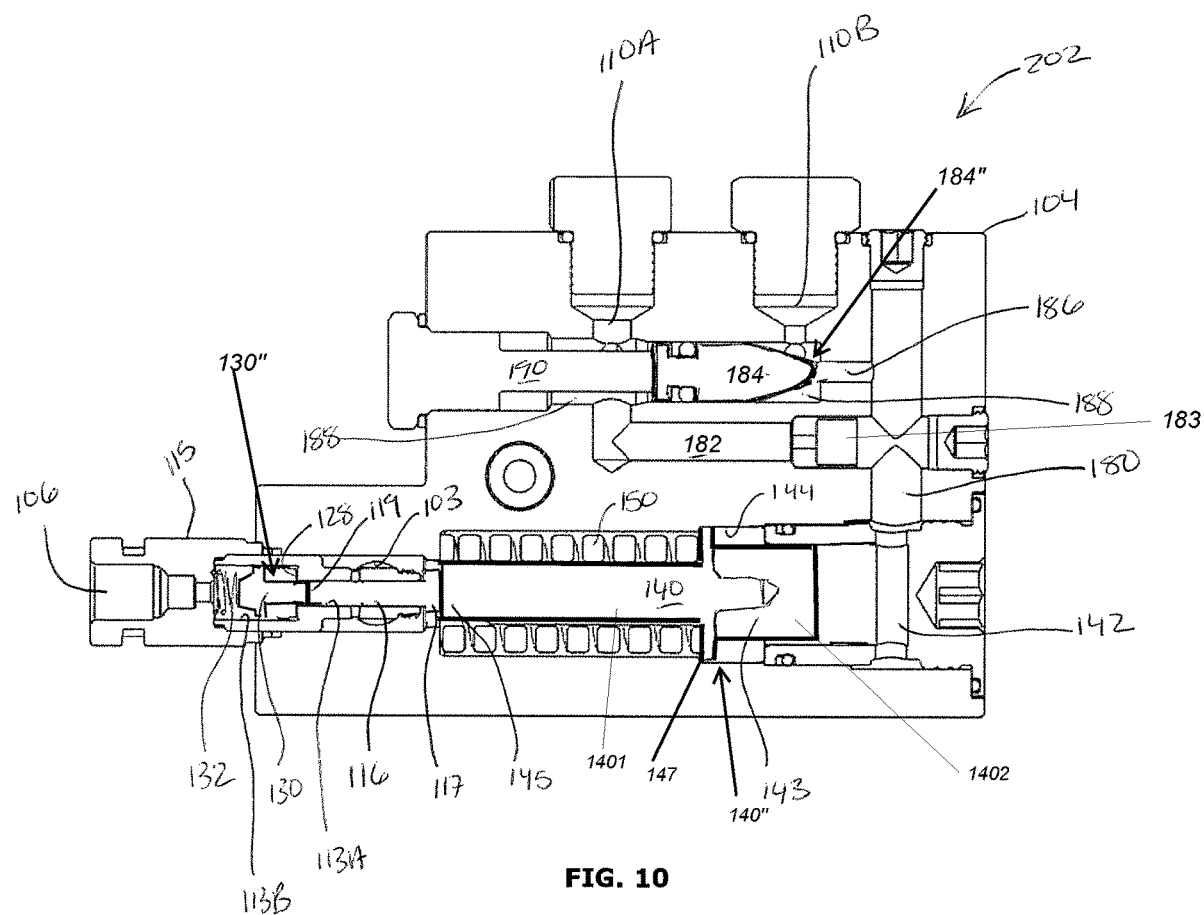
FIG. 10 is a cross-sectional view as shown in FIG. 9 illustrating the second operational state or actuated state of the apparatus.
Figure 11A:
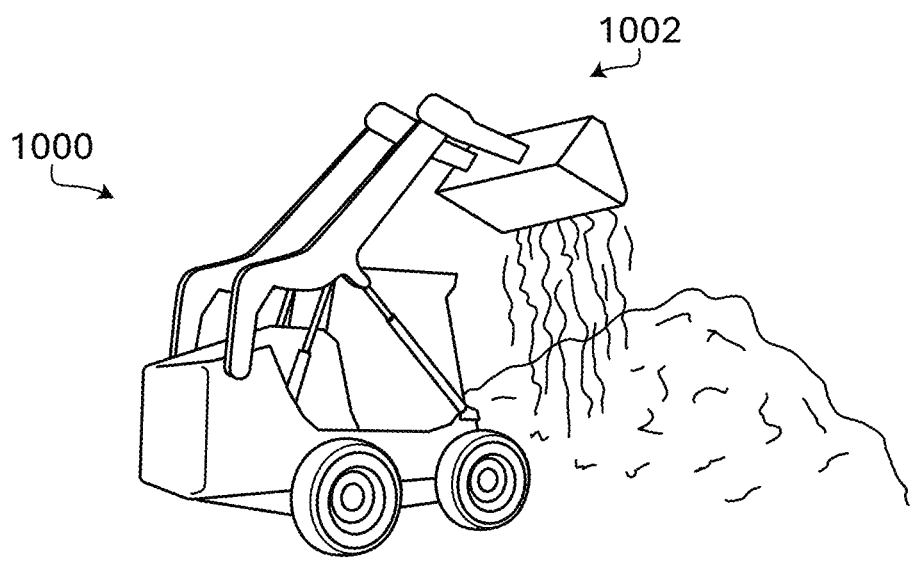
FIG. 11A illustrates an example of an equipment component into which the lubricant delivery apparatus of the present disclosure may be incorporated.
Figure 11B:
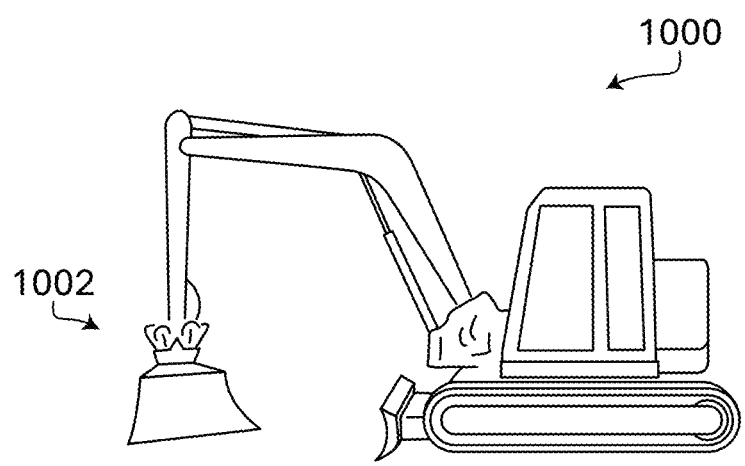
FIG. 11B illustrates another example of an equipment component into which the lubricant delivery apparatus of the present disclosure may be incorporated.
Figure 11C:
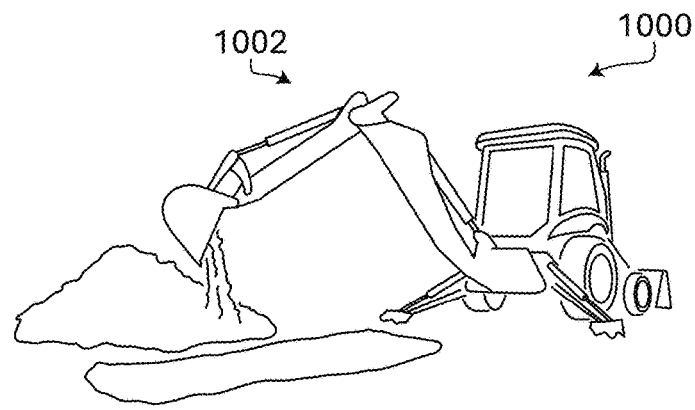
FIG. 11C illustrates another example of an equipment component into which the lubricant delivery apparatus of the present disclosure may be incorporated.

With reference to FIG. 4, the lubricant delivery apparatus 100 is shown in a rest, or non-actuated state 200. While the lubricant delivery apparatus 100 is disposed in the rest, or non-actuated state 200, the lubricant delivery apparatus 100 is disposed for receiving actuating fluid from the corresponding operating system, or hydraulic system with actuating fluid source 1004. While disposed in the rest, or non-actuated state 200, the actuator 140 is disposed in a non-actuated position 140', wherein the actuating fluid-receiving space 142 defines a first actuating fluid-receiving volume 153. While disposed in the rest, or non-actuated state 200, the delivery piston 116 is also disposed in a non-actuated position 116' wherein the lubricant-receiving space 112 defines a predetermined delivery volume that is filled with the pre-determined amount of lubricant 105. While the delivery piston 116 is disposed in a non-actuated position 116', the first end 117 of the delivery piston 116 is spaced apart from the first end of the lubricant metering element body 120 such that the delivery piston 116 is disposed for displacement relative to the lubricant metering element body 120.

Figure 16:
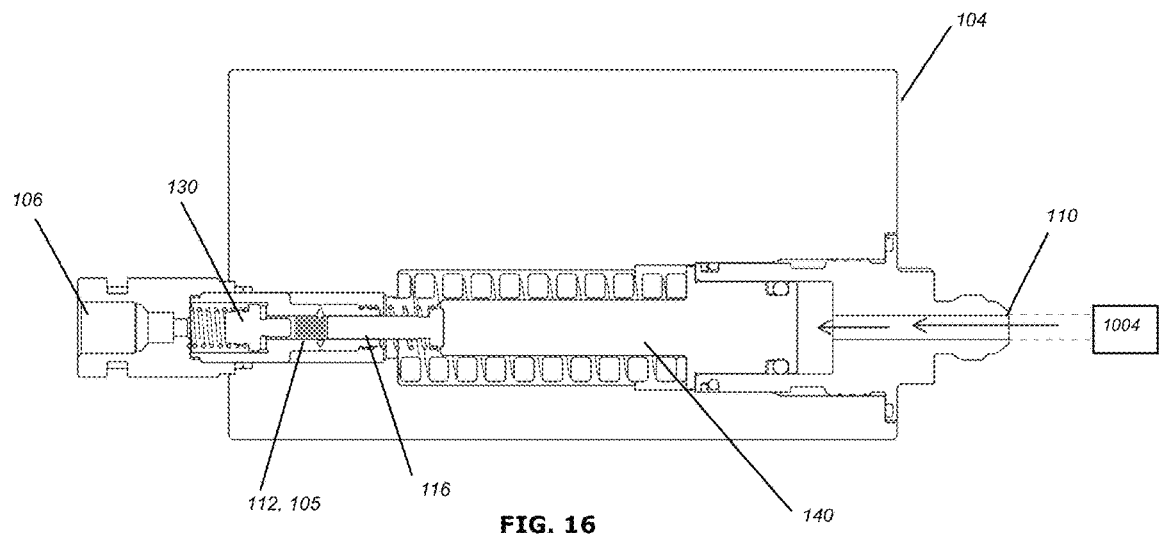
FIG. 16 is the same cross-sectional, detail view shown in FIG. 4 with flow directional arrows illustrating the incoming actuating fluid.
Figure 17:
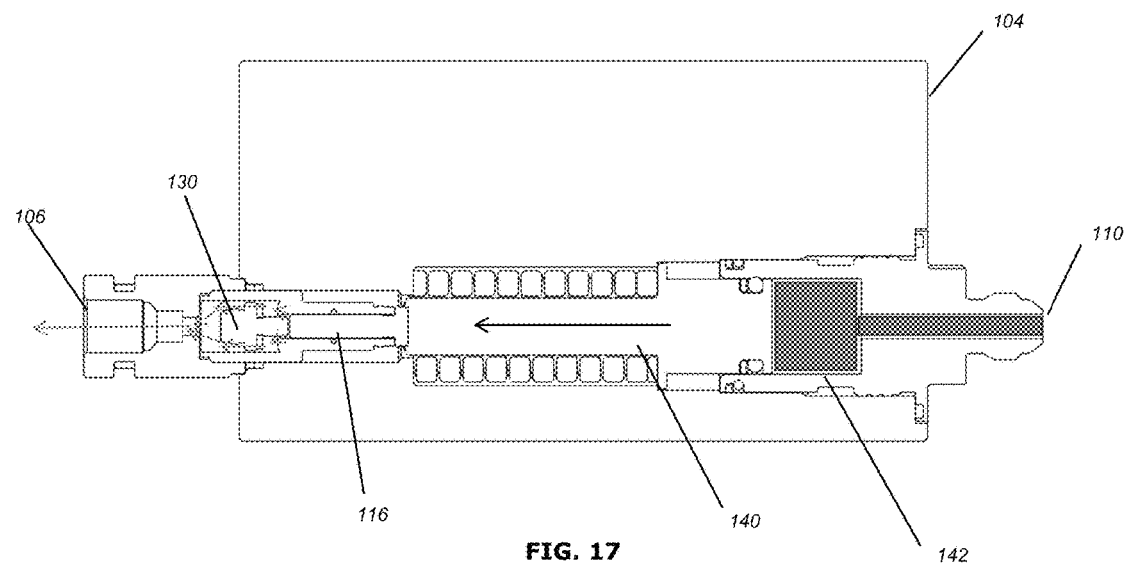
FIG. 17 is similar to the view shown in FIG. 16 illustrating the actuated state with flow directional arrows illustrating the discharge of lubricant from the apparatus and the direction of travel of the actuator.
Figure 18:
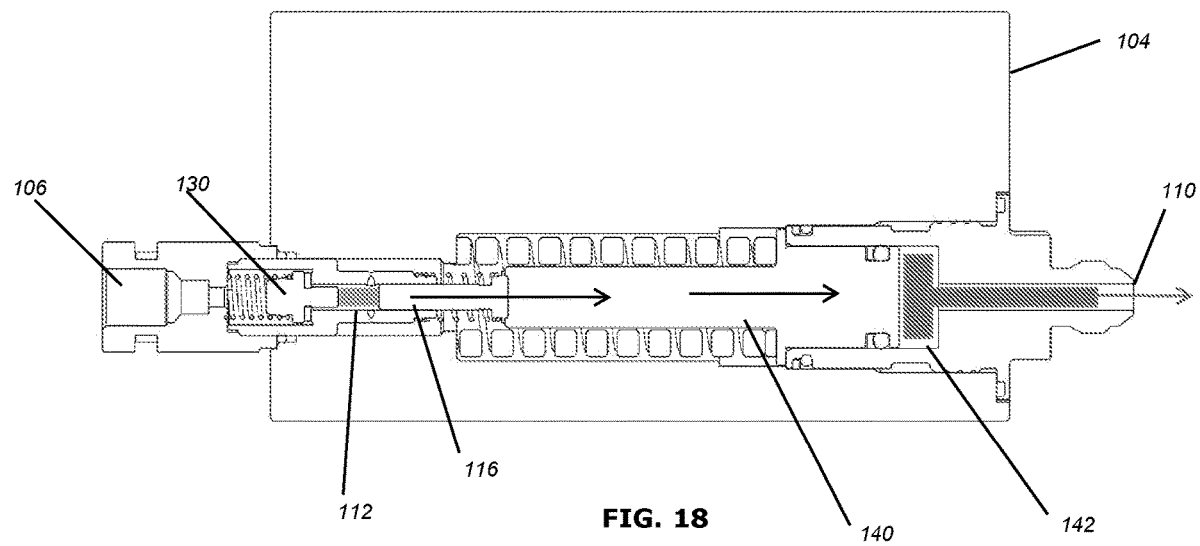
FIG. 18 illustrates the return state of the lubricant delivery apparatus with flow directional arrows illustrating the outgoing actuating fluid and the direction of travel of the actuator.
Figure 19:
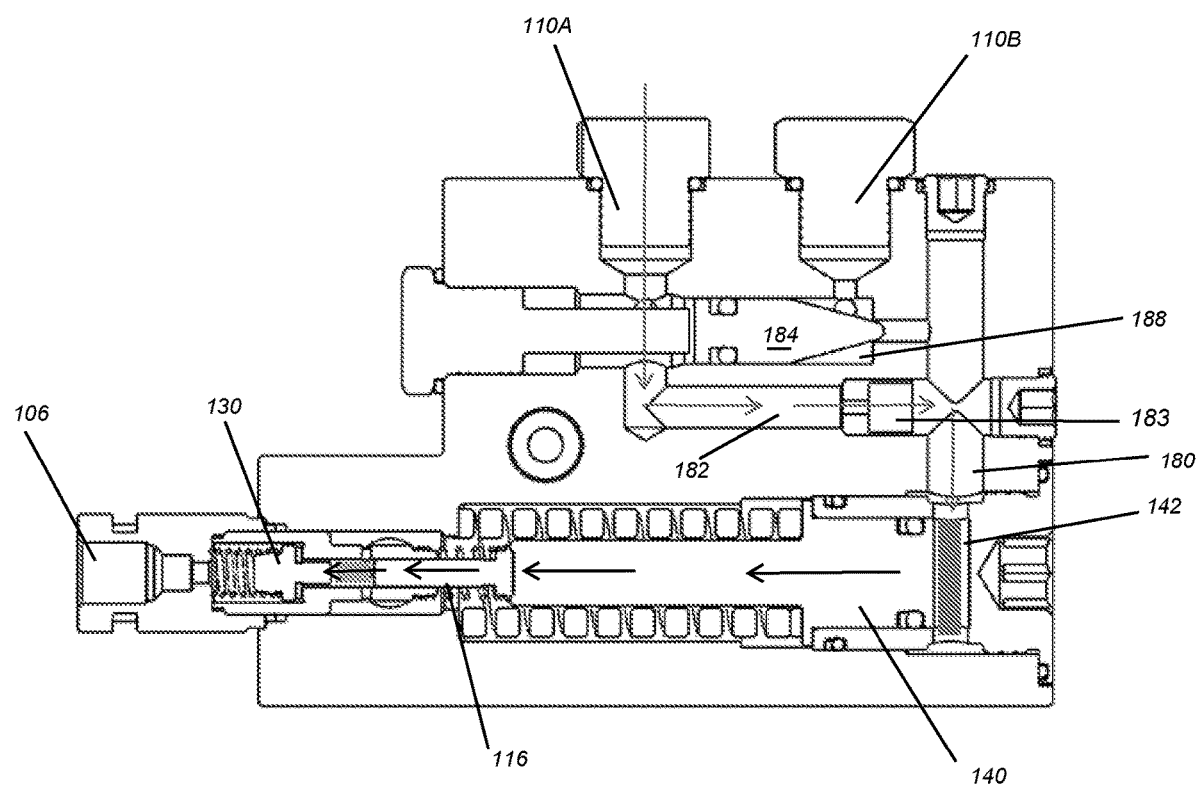
FIG. 19 is similar to the view of FIG. 9 with flow directional arrows illustrating the incoming actuating fluid and the direction of travel of the actuator, delivery piston and valve body.
Figure 20:
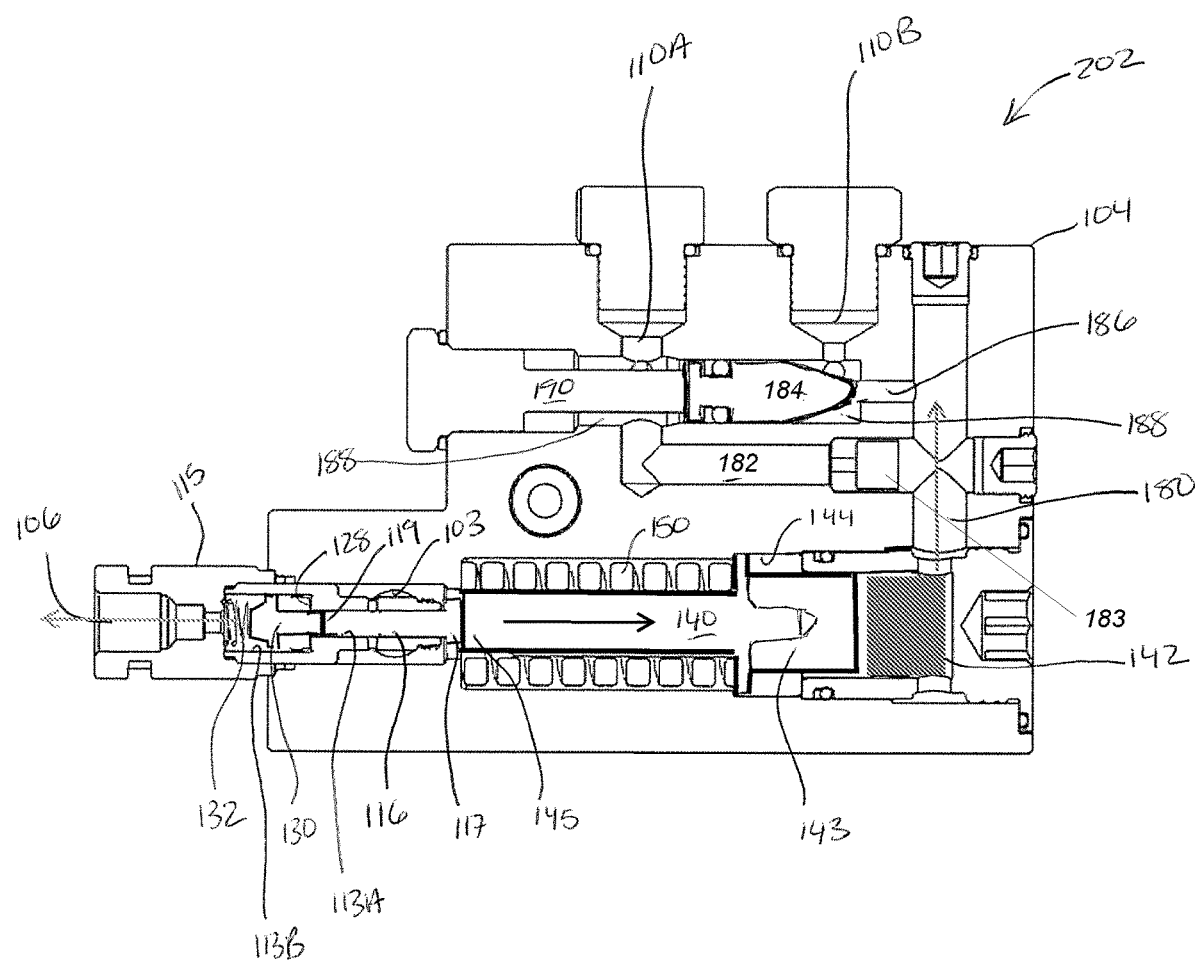
FIG. 20 is similar to the view of FIG. 10 with flow directional arrows illustrating the outgoing actuating fluid and the direction of travel of the actuator.

Once the operator of the device 1000 operates the corresponding moving component 1002, actuating fluid is directed to the lubricant delivery apparatus 100 via connection to the actuating fluid communication port 110 as illustrated, for example in FIG. 16. As the actuating fluid enters the lubricant delivery apparatus 100 via the actuating fluid communication port 110, the actuating fluid fills the actuating fluid-receiving space 142 which serves to transmit an actuating force to the actuator 140. Application of the actuating force to the actuator 140 effects displacement of the actuator 140 as the actuating fluid continues to be supplied to the lubricant delivery apparatus 100, from the source, and continues to transmit the actuating force to the actuator 140. Displacement of the actuator 140 along the actuating passage 144 compresses the actuator-biasing element 150 and effects displacement of the delivery piston 116. Displacement of the delivery piston 116 relative to the lubricant metering element body 120, due to the application of an actuating force to the actuator 140, that exceeds the biasing force applied by the actuator-biasing member 150, effects displacement of the valve body 130 as the actuating force that is applied to the actuator 140 is transmitted to the delivery piston 116 which, in turn, transmits the actuating force to the valve body 130 as the delivery piston 116 acts against the predetermined amount of lubricant 105 contained within the lubricant-receiving space 112. Displacement of the valve body 130 along the second portion 113B of the axially extending passage 113, in response to displacement of the delivery piston 116 that is effected by displacement of the actuator 140 in response to actuating fluid being received within the actuating fluid-receiving space 142, compresses the valve body biasing member 132 and establishes fluid communication between the lubricant receiving space 112 and the second portion 113B of the axially extending passage 113 as the valve body 130 moves away from the shoulder surface 128. Once fluid communication between the lubricant-receiving space 112 and the second portion 113B of the axially extending passage 113 is established, the predetermined amount of lubricant 105 begins to discharge from the lubricant-receiving space 112 and the volume defined by the lubricant-receiving space 112 decreases. As the volume of the lubricant-receiving space 112 decreases, the delivery piston 116 advances further within the lubricant metering element body 120 along the first portion 113A of the longitudinally extending passage 113 and is brought into closer proximity to the valve body 130. Once the entire volume of the predetermined amount of lubricant 105 is discharged from the lubricant-receiving space 112, the volume of the lubricant-receiving space 112 is effectively reduced to zero which coincides with the actuator 140 reaching its maximum displacement as defined by the actuator displacement-limiter 147 which serves to limit the stroke or overall displacement of the actuator 140. Displacement of the delivery piston 116 from the first, non-actuated position 116' to the second, actuated position 116", is with effect that the valve body 130 is displaced from a first, non-actuated position 130' to a second, actuated position 130". Accordingly, once the pump 104 has been actuated such that the valve body 130 is disposed in the second, actuated position 130", the predetermined amount of lubricant 105 that was stored in the lubricant-receiving space 112 is fully discharged from the lubricant delivery apparatus 100 via the lubricant discharge port 106, thereby defining the actuated state 202 of the lubricant delivery apparatus 100. The actuated state 202 of the lubricant delivery apparatus 100 is illustrated, for example, in FIG. 5 and FIG. 17. While the delivery piston 116 is disposed in the second, actuated position 116", wherein the delivery piston 116 is fully advanced within the lubricant metering element body 120, the valve body 130 remains disposed in the actuated position 130" (illustrated in FIG. 5) until the actuation force applied to the actuator 140, via the actuating fluid, is removed. While the delivery piston 116 is disposed in the second, actuated position 116", return of the valve body 130 to the first, non-actuated or closed condition 130' is prevented due to interference provided by the second end 119 of the delivery piston 116 which prevents the return of the valve body 130 to the first, non-actuated or closed condition 130'.

Once the operator of the device 1000 reverses operation of the moving component 1002 such that the flow of actuating fluid being supplied to the lubricant delivery apparatus 100 is reversed, the actuating fluid begins to flow out of the actuating fluid-receiving space 142, via the actuating fluid communication port 110, and the pressure that was previously applied to the actuator 140, by the actuating fluid contained within the actuating fluid-receiving space 142, is relieved. As the pressure that was previously applied to the actuator 140 by the actuating fluid contained within the actuating fluid-receiving space 142 is relieved, the force applied to the actuator 140 no longer exceeds the biasing force applied to the actuator 140 by the actuator-biasing element 150. As the force applied to the actuator 140 by the actuating fluid decreases, the force applied to the actuator 140 by the actuator-biasing member 150 effects displacement of the actuator 140 along the actuating passage 144, in a second direction that is opposite to the first actuation direction, as the volume of the actuating fluid-receiving space 142 decreases. See for instance the example embodiment of FIG. 18. Return of the actuator 140 to the first, non-actuated position 140', wherein the actuating fluid-receiving space 142 defines the first actuating fluid-receiving volume 153 is with effect that the delivery piston 116 retracts from within the lubricant metering element body 120. Retraction of the delivery piston 116 from within the lubricant metering element body 120 in turn causes the valve body 130 to return to the closed, non-actuated position 130'. Continued retraction of the delivery piston 116 from within the lubricant metering element body 120, once the valve body 130 is disposed in the first, closed position 130', is with effect that a further predetermined amount of lubricant 105' is drawn into the lubricant-receiving space 112 from the lubricant supply reservoir 102. Lubricant is drawn into the lubricant-receiving space 112, via the lubricant inlet passage 103 and the lubricant communication ports 114, as the delivery piston 116 travels past the lubricant communication ports 114 while the valve body 130 is disposed in the closed position 130'. Once the delivery piston 116 is returned to the first, non-actuated position 116', with the actuator 140 also being returned to the first, non-actuated position 140', the lubricant delivery apparatus 100 is once again disposed in the rest or non-actuated state 200, as shown for example, in FIG. 6. Therefore, once the operator of the device 1000 begins to activate the moving component 1002 again, the lubricant delivery apparatus 100 is once again configured for discharging a further predetermined amount of lubricant 105' to the moving component 1002.

Referring now to FIGS. 7-10 there is shown another example embodiment of the lubricant delivery apparatus 100 according to the present disclosure. In the subject example embodiment, the lubricant delivery apparatus 100 is configured for installation within a device 1000 that includes one or more moving components 1002, wherein the actuating fluid that is supplied to the moving component 1002, must be returned to the source via a separate, return line. For example, in some embodiments, the moving component 1002 includes a hydraulic hammer tool wherein hydraulic actuating fluid is supplied to the piston of the hydraulic hammer tool, from a source within the associated hydraulic operating system to effect displacement of the piston, with the hydraulic actuating fluid being returned to the source via a separate return line associated with the hydraulic hammer tool (or other moving component 1002). Accordingly, in such example embodiments, rather than the lubricant delivery apparatus 100 being provided with a single actuating fluid communication port 110, as in the example embodiment illustrated in FIGS. 1-6, the lubricant delivery apparatus 100 is provided with an actuating fluid inlet port 110A and an actuating fluid return port 110B as illustrated, for example, in FIG. 7.

In some embodiments, for example, in order to facilitate installation of the lubricant delivery apparatus 100 within the corresponding device 1000, the lubricant delivery device 100 is provided with a first set 110' of actuating fluid inlet and outlet ports 110A, 110B and a second set 110" of actuating fluid inlet and outlet ports 110A, 110B. In some embodiments, for example, the first set 110' of actuating fluid inlet and outlet ports 110A, 110B is disposed on a first side, or first face, 160 of the pump 104 of the lubricant delivery apparatus 100, while the second set 110" of actuating fluid inlet and outlet ports 110A, 110B is disposed on a second side, or second face, 161 of the pump 104 of the lubricant delivery apparatus 100. In some embodiments, for example, the first set of ports 110' are disposed on a front face (or first face 160) of the pump 104 while the second set of ports 110" are disposed on a bottom face (or second face 161) of the pump 104. In some embodiments, for example, the lubricant delivery apparatus 100 is installed within the corresponding actuating fluid operating system associated with the moving component 1002 using one of the first or second sets 110', 110" of actuating fluid inlet and outlet ports 110A, 110B, depending on which set of actuating fluid inlet and outlet ports 110A, 110B is most accessible upon installation of the apparatus 100 within the device 1000. In some embodiments, for example, if the first set 110' of actuating fluid inlet and outlet ports 110A, 110B is used, then the second set of actuating fluid inlet and outlet ports 110A, 110B is plugged or otherwise sealed. Similarly, in some embodiments, for example, if the second set 110" of actuating fluid inlet and outlet ports 110A, 110B is used, then the first set 110' of actuating fluid inlet and outlet ports 110A, 110B is plugged or otherwise sealed. In some embodiments, for example, a combination of the first set 110' and second set 110" of actuating fluid inlet and outlet ports are used. For example, the actuating fluid inlet port 110A of the first set 110' of ports can be used with the actuating fluid outlet port 110B of the second set 110" of ports, or the actuating fluid inlet port 110A of the second set 110" of ports can be used with the actuating fluid outlet port 110B of the first set 110' of ports. Therefore, it will be understood that only one of the actuating fluid inlet ports 110'A, 110"A and only one of the actuating fluid outlet ports 110'B, 110"B is operational, the plurality of ports provided facilitating installation of the apparatus 100 within a variety of different devices 1000 with different actuating fluid connection points for the corresponding moving component 1002.

With reference again to FIG. 7, as in the previously described embodiment, the lubricant delivery apparatus 100 includes a lubricant supply reservoir 102 and a pump 104. The pump 104 is operably coupled to the lubricant supply reservoir 102 and is configured for receiving the predetermined amount of lubricant 105 from the lubricant supply reservoir 102 and for discharging the predetermined amount of lubricant 105, via the lubricant discharge port 106. The pump 104 operates in the same manner as described above in connection with the example embodiment illustrated in FIGS. 3-6, wherein the pump 104 is operably coupled to the lubricant supply reservoir 102 such that the predetermined amount of lubricant 105 is supplied to the lubricant-receiving space 112 defined by the lubricant metering element 108, as illustrated for example in FIG. 15. However, in the subject example embodiment, in order to effect actuation of the lubricant delivery apparatus 100, actuating fluid is supplied to the actuating fluid-receiving space 142, via an actuating fluid communication passage 180 that is supplied by an actuating fluid inlet passage 182 that is in fluid communication with an actuating fluid inlet port 110A (of either the first set 110' of ports or the second set 110" of ports), as shown for example in FIG. 19. As actuating fluid is supplied to the actuating fluid inlet port 110A, the actuating fluid is transmitted to the actuating fluid communication passage 180, via the actuating fluid inlet passage 182, such that actuating fluid is received within the actuating fluid-receiving space 142. In some embodiments, for example, a one-way valve or check valve 183 is disposed within the actuating fluid inlet passage 182 for controlling flow between the actuating fluid inlet passage 182 and the actuating fluid communication passage 180. The check valve 183 functions to allow actuating fluid to flow from the actuating fluid inlet passage 182 to the actuating fluid communication passage 180 but prevents flow of actuating fluid from the actuating fluid communication passage 180 and the actuating fluid inlet passage 182. As actuating fluid is received within the actuating fluid receiving space 142, via the actuating fluid communication passage 180, the force applied to the actuator 140 by the pressurized fluid entering the actuating fluid-receiving space 142 overcomes the biasing force applied to the actuator 140 by the actuator biasing member 150. Once the biasing force is overcome by the pressurized fluid entering the actuating fluid-receiving space 142 and acting against the actuator 140, displacement of the actuator 140 along the actuating passage 144 is effected. Displacement of the actuator 140 along the actuating passage 144 effects displacement of the delivery piston 116 which, in turn, effects displacement of the valve body 130 from the closed position 130' as illustrated, for example, in FIG. 9, to the open position 130" as illustrated, for example, in FIG. 10. Displacement of the valve body 130 from the closed position 130' to the open position 130" establishes fluid communication between the lubricant-receiving space 112 and the lubricant discharge port 106 allowing the predetermined amount of lubricant 105 to be discharged from the lubricant delivery apparatus 100 for delivery to the corresponding moving component 1002.

Once the pressure applied to the actuator 140 by the actuating fluid is relieved, for example, during the course of operation of the moving component 1002 (e.g. a hydraulic hammer wherein actuating fluid is supplied to and directed away from the moving component to effect displacement of the moving component), or once operation of the moving component 1002 is halted, the flow of actuating fluid to the actuating fluid-receiving space 142 is reversed. Accordingly, once the pressure applied to the actuator 140 by the actuating fluid is relieved, actuating fluid begins to flow out of or away from the actuating fluid-receiving space 142 through the actuating fluid communication passage 180. From the actuating fluid communication passage 180, the actuating fluid is directed out of the pump 104 through the actuating fluid return or outlet port 110B via an actuating fluid return passage 186 that fluidly interconnects the actuating fluid communication passage 180 and the actuating fluid return port or outlet port 110B, as shown for example in FIG. 20. As described above, one-way valve or check valve 183 is disposed at the junction of the actuating fluid inlet passage 182 and the actuating fluid communication passage 180 prevents actuating fluid from entering the actuating fluid inlet passage 182 from the actuating fluid communication passage 180 on the return stroke which ensures that the actuating fluid exiting the actuating fluid-receiving space 142 is directed out of the pump 104 through the actuating fluid return port or outlet port 110B.

In some embodiments, for example, in order to ensure that incoming actuating fluid is directed solely to the actuating fluid inlet passage 182 and that outgoing actuating fluid is directed solely to the actuating fluid return port 110B, the pump 104 includes a one-way return valve 184 disposed within a control passage 188 that interconnects the actuating fluid inlet port 110A and the actuating fluid outlet port 110B. In some embodiments, for example, the return valve 184 is disposed within the control passage 188 in a normally closed position 184' as shown, for example in FIG. 9. Accordingly, as actuating fluid is supplied to the actuating fluid inlet port 110A, the actuating fluid is directed to the actuating fluid communication passage 180 via the actuating fluid inlet passage 182 as the return valve 184 seals communication between the actuating fluid inlet port 110A and the return port 110B. Accordingly, in the subject example embodiment, incoming actuating fluid is fluidly isolated from the outgoing actuating fluid.

When the pressure at the inlet port 110A is relieved, for example, when the moving component 1002 is no longer in the process of being actuated, or the hydraulic actuating cylinder is operating on a return stroke, actuating fluid is no longer supplied to the actuating fluid inlet port 110A. As a result, the flow of actuating fluid to the actuating fluid-receiving space 142 is reversed with actuating fluid flowing from the actuating fluid-receiving space 142 and through the actuating fluid communication passage 180, in the opposite direction, with the change in pressure associated with the actuating system of the device 1000. With the drop in pressure at the actuating fluid inlet port 110A, there is an increase in pressure within the actuating fluid communication passage 180 which effects opening of the return valve 182 from its closed position 184' (see FIG. 9) to an open position 184'' (see FIG. 10) which establishes fluid communication between the actuating fluid communication passage 180 and the actuating fluid outlet or return port 110B via the actuating fluid return passage 186. In some embodiments, for example, it is the relieving of pressure at the inlet port 110A coupled with an increase of pressure within the actuating fluid communication passage 180, as flow to the actuating fluid-receiving space 142 is reversed, which effects opening of the return valve 184 and establishes fluid communication between the actuating fluid communication passage 180 and the outlet port 110B, via the actuating fluid return passage 186.

In some embodiments, for example, the return valve 184 is disposed within the control passage 188 in a neutral position. In such example embodiments, the return valve 184 toggles from the neutral position (not shown), intermediate the inlet port 110A and the outlet port 110B, to a closed position 184' when pressure is applied to the inlet port 110A by the supply of actuating fluid. From the closed position 184', the return valve will toggle to the open position 184'' when the pressure applied to the inlet port 110B is removed or relieved. In some embodiments, for example, the pump 104 includes a return valve stroke limiter 190 disposed within the control passage 188 for limiting the displacement of the return valve 184 within the control passage 188, the return valve stroke limiter 190 therefore defining the return stroke of the return valve 184. In some embodiments, for example, the return valve 184 is a shuttle valve.

As described above in connection with the example embodiments illustrated in FIGS. 1-6 and FIGS. 7-10, the predetermined amount of lubricant 105 that is supplied to the pump 104 is defined by the volume provided by the lubricant-receiving space 112 defined within the lubricant metering element 108. Depending on the particular application, the amount of lubricant that is required for each actuation of the lubricant delivery apparatus 100 may vary. In order to ensure that an appropriate amount of lubricant is discharged from the lubricant delivery apparatus 100, the lubricant metering element 108 can be interchanged wherein the particular sizes of the delivery piston 116 and the valve body 130 are different so as to define different lubricant receiving space 112 volumes. Additionally, in some embodiments, for example, actuator 140 is of unitary one-piece construction while in other embodiments, for example, the actuator 140 may have a two-piece design that includes a shaft 1401 and head 1402, wherein the head 1402 is mounted on one end of the shaft 1401 with the other end of the shaft 1401 being operably coupled to the delivery piston 116. In such embodiments, for example, the shaft 1401 and the head 1402 that make up the actuator 140 can be changed for larger or smaller diameter components, depending on the particular application in order to adjust the lubricant delivery apparatus 100 for operation under lower or higher operating conditions. Larger or smaller diameter actuator heads 1402 are mated with corresponding larger or smaller diameter hydraulic communication port fittings or adapters for ensuring effective coupling to the corresponding actuating fluid lines within the overall actuating fluid operating system within the device 1000.

Conventional greasing or lubrication systems often use programmable timers to meter the amount of grease or lubricant that is supplied to the moving component based on the run time of a platform or vehicle or device on which it is installed. In the subject lubricant delivery apparatus 100, the lubricant (or grease) is delivered to the moving component 1002 every time the hydraulic port (or actuating port) to which is it plumbed or operably coupled is pressurized. Accordingly, the subject lubricant delivery apparatus 100 will only provide lubricant or grease to the corresponding moving component 1002 when the equipment is in use. A timer-controlled system will grease the equipment even when the equipment is on but not in use, such as while the equipment is idling. In some embodiments, for example, the subject lubricant delivery apparatus 100 will deliver lubricant to the corresponding moving component 1002 more often than a timer-controlled system, for example, in instances where the moving component 1002 is in frequent use.

As described above, an appropriately sized lubricant metering element 108 can be selected for a particular application to ensure than an appropriate amount of lubricant is discharged from the apparatus 100 for a particular application. Example embodiments of various sizes of lubricant metering elements 108 that can be incorporated into the lubricant delivery apparatus 100 are shown, for example, in FIG. 13 wherein the various lubricant metering element sizes are coded, in some fashion, based on the corresponding CC's/Stroke defined by the corresponding lubricant metering element 108. In some embodiments, for example, it is recommended that the selection of the lubricant metering element 108 for a given application be biased towards a heavier lubricant application since, in some embodiments, the subject lubricant delivery apparatus 100 will deliver less grease, or less lubricant, to a moving component 1002 (or grease point within the device 1000) within a certain period of time as compared to a timer-controlled system, depending on the actual use of the moving component 1002. Accordingly, it will be understood that a suitable lubricant metering element 108 will be selected for a particular application in accordance with principles known in the art and based on the manufacturers recommendations on the amount of lubrication required for a particular component 1002. Therefore, grease requirements of the manufacturer for the equipment into which the lubrication system is to be installed should be followed when selecting the element size. With reference, in particular, to the Table shown in FIG. 14, various examples of the CC's/hour of the lubricant for various equipment or devices 1000 with moving components 1002 are shown. FIG. 14, therefore provides an indication of suggested starting points for the lubrication needs for various devices 1000 although it will be understood that the lubrication requirements for a moving component 1002 of a device 1000 are typically based on the size of equipment, the number of grease points to be lubricated, and the machines working environment.

With reference again to the example embodiment illustrated in FIGS. 1-6, in some embodiments, for example, the pump 104 includes an air bleed port 194 for allowing any residual air trapped within the pump 104 or within the lubricant supply reservoir 102 to escape when the lubricant supply reservoir 102 is first coupled to the pump 104. The air bleed port 194 includes an air bleed port passage 194(1) that is in fluid communication with the lubricant inlet passage 103 such that opening of the air bleed port 194 (via bleed screw 194(2)) is with effect that any air trapped within the lubricant supply reservoir 102 is allowed to escape from the apparatus 100 via the air bleed port 194 which ensures that the predetermined amount of lubricant 105 is drawn into the lubricant-receiving space 112. When the lubricant supply reservoir 102 is changed, the air bleed port 194 can be used to bleed the apparatus 100 of residual air and to ensure that the first charge of the predetermined amount of lubricant 105 is delivered to the lubricant receiving space 112.

In some embodiments, for example, the lubricant delivery apparatus 100 is equipped with a low level lubricant sensor or switch 192 that is operably coupled to a low level lubricant indicator, such as a light. Accordingly, as the level of lubricant contained within the lubricant supply reservoir 102 decreases with each actuation of the apparatus 100, once the lubricant level reaches the low level sensor 192, the low level lubricant indicator will activate (e.g. a low level light indicator will illuminate) to provide an indication to the operator that the lubricant supply reservoir 112 will need to be changed or otherwise re-filled to ensure proper operation of the apparatus 100.

In some embodiments, for example, the lubricant supply reservoir 102 includes one or more view ports 196 that provide visual access to the interior of the lubricant supply reservoir 102 in order to provide an operator a visual indication of the quantity of lubricant remaining in the reservoir 102. Accordingly, view ports 196 provides another indication to the operator of the device 1000 that the lubricant supply reservoir 102 requires replacement or maintenance.

Figure 12:
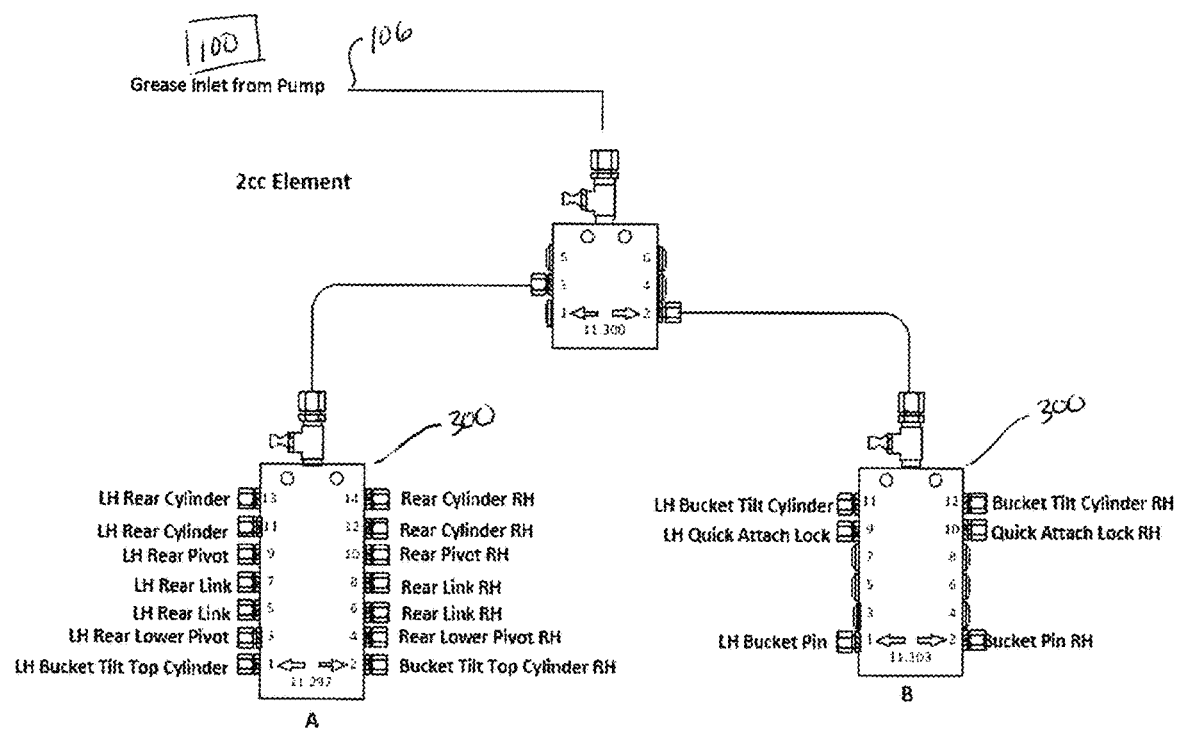
FIG. 12 is a schematic illustration of an example embodiment of a system layout into which the lubricant delivery apparatus of the present disclosure may be incorporated.
Figure 15:
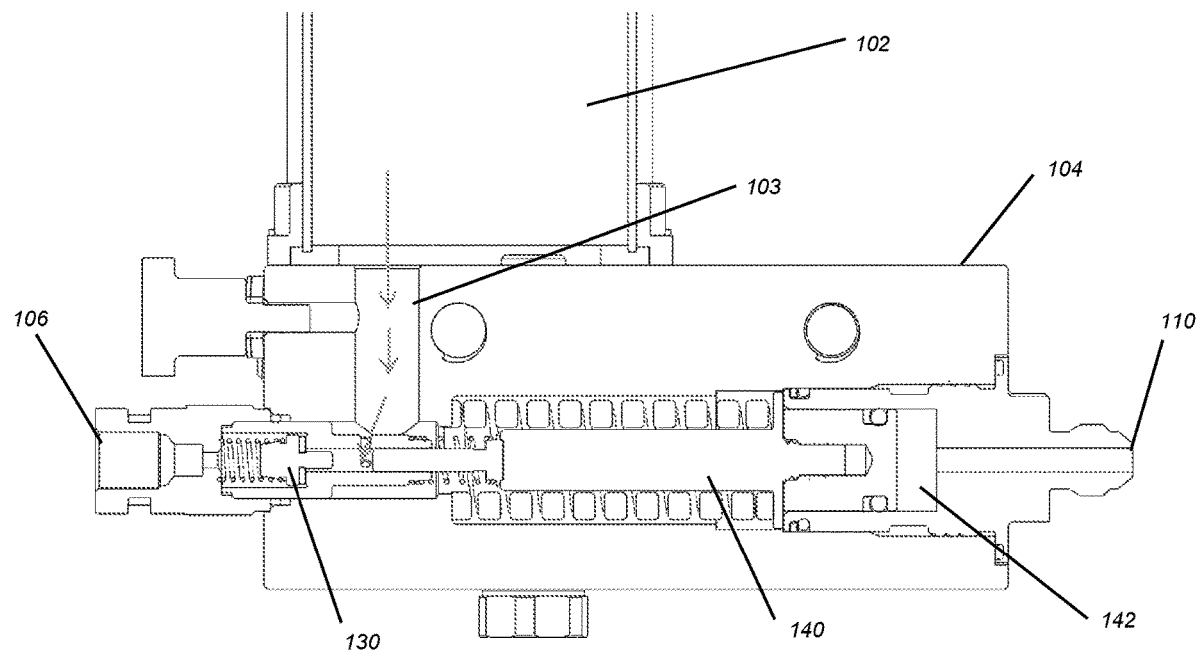
FIG. 15 is a cross-sectional, detail view of the base of the lubricant delivery apparatus of FIG. 1 taken along section line 3-3 of FIG. 2 with flow directional arrows illustrating the delivery of lubricant to the lubricant-receiving space.

In some embodiments, for example, the lubricant delivery apparatus 100 is installed within a device 1000 such that the lubricant discharge port 106 is fluidly coupled to a lubricant distribution manifold 300 for distributing the lubricant discharged from the lubricant delivery apparatus 100 to one or more of a plurality of moving components 1002 associated with the device 1000. FIG. 12 illustrates an example system layout for the incorporation of the lubricant delivery apparatus 100 into a device 1000 in the form of a skid steer loader wherein the system includes a progressive distribution manifold or progressive flow divider 1003 for dividing the flow of lubricant discharged from apparatus 100 to one or more of the associate moving components 1002. Accordingly, various grease points or lubrication-requiring points (i.e. moving components 1002) on the device 100 are provided with grease or the required lubrication upon actuation of the lubricant delivery apparatus 100 via the progressive distribution manifold or progressive flow divider 300.

In some embodiments, for example, the lubricant delivery apparatus 100 includes a lubricant return port 197 that is configured for returning a portion of the lubricant that is discharged from the lubricant delivery apparatus 100 to the lubricant supply reservoir 102. Accordingly, in some embodiments, when the lubricant discharge port 106 is fluidly coupled to a progressive flow divider or distribution manifold 300, one of the outlet ports on the progressive flow divider or distribution manifold 300 is plumbed back to the lubricant return port 197 While various example embodiments of the lubricant delivery apparatus 100 have been described, certain adaptations and modifications of the described embodiments can be made. Therefore, the above discussed embodiments are considered to be illustrative and not restrictive.

What is claimed is:

1. A lubricant delivery apparatus configured for installation within a device that includes a moving component that is actuated by an actuating fluid from an actuating fluid source of the device, comprising:
   a lubricant supply reservoir configured for storing a supply of lubricant;
   a pump operably coupled to the lubricant supply reservoir for receiving a pre-determined amount of lubricant from the lubricant supply reservoir and discharging the pre-determined amount of lubricant from the lubricant delivery apparatus via a lubricant discharge port; and
   an actuating fluid communication port configured for operably coupling to the actuating fluid source such that the actuating fluid communication port is in fluid communication with the actuating fluid source associated with the moving component of the device for receiving a flow of actuating fluid in response to actuation of the moving component by the actuating fluid from the actuating fluid source and for returning the actuating fluid to the actuating fluid source;
   the lubricant delivery apparatus having:
   a non-actuated state, wherein the predetermined amount of lubricant is disposed within the pump and the pump is disposed for receiving actuating fluid from the actuating fluid source of the device via the actuating fluid communication port; and
   an actuated state wherein the predetermined amount of lubricant is discharged from the pump via a lubricant discharge port;
   and
      while the lubricant delivery apparatus is installed on the device, the actuating fluid communication port is configured for receiving actuating fluid from the actuating fluid source in response to transitioning of the moving component from a non-actuated state to an actuated state and for discharging actuating fluid for returning the actuating fluid to the actuating fluid source in response to transitioning of the moving component from the actuated state to the non-actuated state such that actuation of the moving component is with effect that:
- actuating fluid is supplied to the lubricant delivery apparatus via the actuating fluid communication port; and
- the lubricant delivery apparatus transitions from the non-actuated state to the actuated state.

2. The lubricant delivery apparatus as claimed in of claim 1,
wherein the pump comprises:
- a lubricant metering element defining a lubricant-receiving space configured for receiving the pre-determined amount of lubricant; and
- an actuator operably coupled to the lubricant metering element and configured for displacement between a first, non-actuated position and a second, actuated position; and transitioning of the actuator from the first, non-actuated state to the second, actuated state with effect that the pre-determined amount of lubricant is discharged from the lubricant-receiving space.

3. The lubricant delivery apparatus as claimed in of claim 2 further comprising:
an actuating fluid-receiving space in fluid communication with the actuating fluid communication port;
wherein:
the actuating fluid-receiving space is configured for receiving the supply of actuating fluid from the actuating fluid source of the device;
and
while the lubricant delivery apparatus is disposed in the non-actuated state:
the actuator is disposed in the non-actuated position;
the actuating fluid-receiving space defines a first, actuating fluid-receiving volume;
and
there is an absence of a flow of actuating fluid to the actuating fluid-receiving space;
and
while the lubricant delivery apparatus is disposed in the actuated state:
the actuator is disposed in the actuated position; and
the actuating fluid-receiving space defines a second, actuating fluid-receiving volume that is greater than the first, actuating fluid-receiving volume with effect that the actuator is displaced from the non-actuated state to the actuated state.

4. The lubricant delivery apparatus of claim 3, wherein:
the actuator is disposed for displacement along an actuating passage from the first, non-actuated position to the second, actuated position;
at least a portion of the actuating passage defines the actuating fluid-receiving space; and
the actuator is disposed within the actuating passage such that the actuator defines at least a portion of the actuating fluid-receiving space.

5. The lubricant delivery apparatus of claim 4 further comprising: an actuator-biasing member disposed in the actuating passage and configured for biasing the actuator in the first, non-actuated position.

6. The lubricant delivery of claim 3, wherein the lubricant metering element comprises:
a valve member comprising:
a closed position, wherein there is an absence of fluid communication between the lubricant-receiving space and the lubricant discharge port;
an open position, wherein fluid communication between the lubricant-receiving space and the lubricant discharge port is established;
and
transitioning of the valve member from the closed position to the open position is effected in response to displacement of the actuator from the first, non-actuated position and a second, actuated position.

7. The lubricant delivery apparatus of claim 6,
wherein the lubricant metering element comprises:
a body defining a longitudinally extending passage; and
a delivery piston disposed within the body and configured for displacement along the longitudinally extending passage;
the lubricant-receiving space is defined within the longitudinally extending passage; and
the delivery piston is operably coupled to the actuator such that displacement of the actuator from the first, non-actuated position to the second, actuated position effects displacement of the delivery piston such that the valve member transitions from the closed position to the open position.

8. The lubricant delivery apparatus of claim 7,
wherein the lubricant-metering element further comprises:
a delivery piston biasing-member disposed intermediate a first end of the delivery piston and a first end of the lubricant-metering element body for biasing the delivery piston in the first, non-actuated position; and
a valve body-biasing member disposed intermediate the valve body and the lubricant discharge port for biasing the valve body in the closed position.

9. The lubricant delivery apparatus of claim 2, wherein the pump comprises:
a lubricant inlet passage fluidly interconnecting the lubricant supply reservoir and the lubricant metering element such that the pre-determined amount of lubricant from the lubricant supply reservoir is delivered to the lubricant receiving space via the lubricant receiving passage.

10. The lubricant delivery apparatus of claim 9,
wherein the lubricant metering element comprises one or more lubricant communicators disposed within the body for effecting fluid communication between the lubricant receiving passage and the lubricant-receiving space.

11. The lubricant delivery apparatus of claim 10,
wherein transitioning of the apparatus from the actuated state to the non-actuated state is with effect that a further pre-determined amount of lubricant from the lubricant supply reservoir is disposed within the lubricant-receiving space via the lubricant-receiving passage and the one or more lubricant communicators.

12. The lubricant delivery apparatus of claim 9 further comprising:
a bleed port in fluid communication with the lubricant inlet passage for discharging residual air from within the lubricant delivery apparatus,
wherein the discharge of residual air from the lubricant delivery apparatus via the bleed port is with effect that a first pre-determined amount of lubricant is delivered to the lubricant-receiving space from the lubricant supply reservoir.

13. The lubricant delivery apparatus of claim 1 further comprising:
a lubricant low-level sensor operably coupled to:
the lubricant supply reservoir for sensing when the supply of lubricant remaining in the lubricant supply reservoir is at or below a pre-determined threshold; and
an indicator for providing an indication that the supply of lubricant within the lubricant supply reservoir is at or below the pre-determined threshold.

14. The lubricant delivery apparatus of claim 1, wherein the moving component is one of a plurality of moving components;
the lubricant delivery apparatus further comprising:
a lubricant distribution manifold operably coupled to the lubricant discharge port;
and
while the lubricant delivery apparatus is installed on the device in fluid communication with the actuating fluid source and one or more of the plurality of moving components is actuated via the actuating fluid source such that the one or more of the plurality of moving components transitions from a non-actuated state to an actuated state,
wherein the lubricant delivery apparatus is disposed in the actuated state such that the pre-determined amount of lubricant discharged from the lubricant delivery apparatus, via the lubricant discharge port, and is delivered to the one or more moving components of the plurality of moving components via the lubricant distribution manifold.

15. A lubricant delivery apparatus configured for installation within a device that includes a moving component that is actuated by an actuating fluid from an actuating fluid source of the device, comprising:
a lubricant supply reservoir configured for storing a supply of lubricant;
a pump operably coupled to the lubricant supply reservoir for receiving a pre-determined amount of lubricant from the lubricant supply reservoir and discharging the pre-determined amount of lubricant from the lubricant delivery apparatus via a lubricant discharge port;
and
an actuating fluid communication port configured for operably coupling to the actuating fluid source such that the actuating fluid communication port is in fluid communication with the actuating fluid source associated with the moving component of the device for receiving a supply of actuating fluid in response to actuation of the moving component by the actuating fluid from the actuating fluid source;
wherein the actuating fluid communication port is in fluid communication with an actuating fluid communication passage; and
the actuating fluid communication passage is configured for fluid communication with:
an actuating fluid inlet passage configured for receiving a flow of actuating fluid from the actuating fluid source via an actuating fluid inlet port; and
an actuating fluid return passage configured for returning actuating fluid to the actuating fluid source via an actuating fluid return port;
and,
while the lubricant delivery apparatus is installed on the device in fluid communication with the actuating fluid source:
the actuating fluid communication passage is disposed in fluid communication with the actuating fluid inlet passage in response to transitioning of the moving component from a non-actuated state to an actuated state; and
the actuating fluid communication passage is disposed in fluid communication with the actuating fluid return passage in response to transitioning of the moving component from the actuated state to the non-actuated state;
the lubricant delivery apparatus having:
a non-actuated state, wherein the predetermined amount of lubricant is disposed within the pump and the pump is disposed for receiving actuating fluid from the actuating fluid source of the device via the actuating fluid communication port; and
an actuated state wherein the predetermined amount of lubricant is discharged from the pump via a lubricant discharge port;
and
while the lubricant delivery apparatus is installed on the device, in fluid communication with the actuating fluid source, actuation of the moving component is with effect that:
actuating fluid is supplied to the lubricant delivery apparatus via the actuating fluid communication port; and
the lubricant delivery apparatus transitions from the non-actuated state to the actuated state.

16. The lubricant delivery apparatus of claim 15, further comprising:
a one-way valve for controlling flow between the actuating fluid inlet passage and the actuating fluid communication passage such that flow from the actuating fluid inlet passage to the actuating fluid communication passage is permitted while flow from the actuating fluid communication passage to the actuating fluid inlet passage is prevented.

17. The lubricant delivery apparatus of claim 15 further comprising:
a return valve for controlling fluid communication between the actuating fluid communication passage and the actuating fluid return port such that:
while actuating fluid is being supplied to the actuating fluid inlet port, fluid communication between the actuating fluid communication passage and the actuating fluid return port is prevented; and
while there is an absence of actuating fluid being supplied to the actuating fluid inlet port, fluid communication between the actuating fluid communication passage the actuating fluid return port is permitted.

18. The lubricant delivery apparatus of claim 17 wherein:
the return valve is disposed within a control passage fluidly interconnecting the actuating fluid inlet port and the actuating fluid return port;
and
while the lubricant delivery apparatus is installed on the device in fluid communication with the actuating fluid source, and the moving component is actuated such that the moving component transitions from a non-actuated state to an actuated state:
a flow of actuating fluid is supplied to the actuating fluid inlet passage via the actuating fluid inlet port; and
the return valve is disposed in a closed position fluidly isolating the actuating fluid return port from the actuating fluid inlet passage such that actuating fluid is transmitted to actuating fluid receiving space via the actuating fluid communication passage;

and while the lubricant delivery apparatus is installed on the device in fluid communication with the actuating fluid source, and the moving component transitions from the actuated state to the non-actuated state:
- there is an absence of the flow of actuating fluid to the actuating fluid inlet passage via the actuating fluid inlet port; and
- the return valve is disposed in an open position with effect that actuating fluid that is discharged from the actuating fluid-receiving space is directed to the actuating fluid return port from the actuating fluid communication passage via an actuating fluid return passage.

19. An apparatus including a moving component that is actuated by an actuating system that operates via an actuating fluid that is supplied to the actuating system from an actuating fluid source comprising:
- a lubricant delivery apparatus for delivering a predetermined amount of lubricant to the moving component upon actuation of the moving component, wherein the lubricant delivery apparatus includes:
  - a lubricant supply reservoir configured for storing a supply of lubricant;
  - a pump operably coupled to the lubricant supply reservoir for receiving a pre-determined amount of lubricant from the lubricant supply reservoir and discharging the pre-determined amount of lubricant from the lubricant delivery apparatus via a lubricant discharge port that is operably coupled to the moving component; and
  - an actuating fluid communication port operably coupled to the actuating system such that the actuating fluid communication port is in fluid communication with the actuating fluid source associated with the moving component of the device for receiving a supply of actuating fluid from the actuating fluid source in response to actuation of the moving component by the actuating fluid and for returning the actuating fluid to the actuating fluid source;
  - the lubricant delivery apparatus having:
    - a non-actuated state, wherein the predetermined amount of lubricant is disposed within the pump and the pump is disposed for receiving actuating fluid from the actuating fluid source via the actuating fluid communication port;
    - an actuated state wherein the predetermined amount of lubricant is discharged from the pump via a lubricant discharge port;

and actuation of the moving component is with effect that actuating fluid is supplied to the lubricant delivery apparatus via the actuating fluid communication port in response to transitioning of the moving component from a non-actuated state to an actuated state with effect that the lubricant delivery apparatus transitions from the non-actuated state to the actuated state; and
in response to transitioning of the moving component from the actuated state to a non-actuated state, actuating fluid is discharged from the actuating fluid communication port for returning the actuating fluid to the actuating fluid source in response.

20. An apparatus including a moving component that is actuated by an actuating system that operates via an actuating fluid that is supplied to the actuating system from an actuating fluid source comprising:
- a lubricant delivery apparatus for delivering a predetermined amount of lubricant to the moving component upon actuation of the moving component, wherein the lubricant delivery apparatus includes:
  - a lubricant supply reservoir configured for storing a supply of lubricant;
  - a pump operably coupled to the lubricant supply reservoir for receiving a pre-determined amount of lubricant from the lubricant supply reservoir and discharging the pre-determined amount of lubricant from the lubricant delivery apparatus via a lubricant discharge port that is operably coupled to the moving component; and
- an actuating fluid communication port operably coupled to the actuating system such that the actuating fluid communication port is in fluid communication with the actuating fluid source associated with the moving component of the device for receiving a supply of actuating fluid in response to actuation of the moving component by the actuating fluid from the actuating fluid source; wherein:
  - the actuating fluid communication port is in fluid communication with an actuating fluid communication passage; and
  - the actuating fluid communication passage is configured for fluid communication with:
    - an actuating fluid inlet passage configured for receiving a flow of actuating fluid from the actuating fluid source via an actuating fluid inlet port; and
    - an actuating fluid return passage configured for returning actuating fluid to the actuating fluid source via an actuating fluid return port;

and, while the lubricant delivery apparatus is installed on the device in fluid communication with the actuating fluid source:
- the actuating fluid communication passage is disposed in fluid communication with the actuating fluid inlet passage in response to transitioning of the moving component from a non-actuated state to an actuated state; and
- the actuating fluid communication passage is disposed in fluid communication with the actuating fluid return passage in response to transitioning of the moving component from the actuated state to the non-actuated state;

the lubricant delivery apparatus having:
- a non-actuated state, wherein the predetermined amount of lubricant is disposed within the pump and the pump is disposed for receiving actuating fluid from the actuating fluid source of the device via the actuating fluid communication port; and
- an actuated state wherein the predetermined amount of lubricant is discharged from the pump via a lubricant discharge port;

and actuation of the moving component is with effect that:
- actuating fluid is supplied to the lubricant delivery apparatus via the actuating fluid communication port; and
- the lubricant delivery apparatus transitions from the non-actuated state to the actuated state.

* * * * *